(12) United States Patent
Hedayat

(10) Patent No.: US 10,469,631 B2
(45) Date of Patent: Nov. 5, 2019

(54) SYSTEMS AND METHODS FOR MULTI-USER RESOURCE ASSIGNMENTS

(71) Applicant: NEWRACOM, INC., Irvine, CA (US)

(72) Inventor: Ahmad Reza Hedayat, Aliso Viejo, CA (US)

(73) Assignee: NEWRACOM, INC., Lake Forest, CA (US)

( * ) Notice: Subject to any disclaimer, the term of this patent is extended or adjusted under 35 U.S.C. 154(b) by 159 days.

(21) Appl. No.: 14/949,810

(22) Filed: Nov. 23, 2015

(65) Prior Publication Data

US 2016/0150505 A1 May 26, 2016

Related U.S. Application Data

(60) Provisional application No. 62/149,472, filed on Apr. 17, 2015, provisional application No. 62/083,136, filed on Nov. 21, 2014.

(51) Int. Cl.
| | |
|---|---|
| *H04L 29/06* | (2006.01) |
| *H04W 72/04* | (2009.01) |
| *H04W 72/12* | (2009.01) |

(52) U.S. Cl.
CPC .............. *H04L 69/22* (2013.01); *H04W 72/04* (2013.01); *H04W 72/1289* (2013.01)

(58) Field of Classification Search
CPC ............................... H04L 69/22; H04W 72/04
See application file for complete search history.

(56) References Cited

U.S. PATENT DOCUMENTS

| | | | |
|---|---|---|---|
| 8,218,465 B1 * | 7/2012 | Hou ..................... | H04B 7/2643 370/311 |
| 9,668,258 B2 * | 5/2017 | Kenney ............... | H04W 72/044 |

(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.

(Continued)

*Primary Examiner* — Noel R Beharry
*Assistant Examiner* — Rodrick Mak
(74) *Attorney, Agent, or Firm* — Morgan, Lewis & Bockius LLP

(57) ABSTRACT

In an example of multi-user wireless communications, an access point may send a downlink frame, including a common field and a user specific field, to multiple stations. The common field and the user specific field are located in a header field called a high efficiency signal-B (HE SIG-B) field. The common field includes information for all of the stations. The user specific field includes multiple sub-fields. At least one of the multiple sub-fields is for each of the stations. The stations may decode their respective portions of the downlink frame based on the common field and their respective sub-field(s). Some or all of the stations may generate and transmit their respective uplink frames, for multi-user transmission such as OFDMA, based on the common field and their respective sub-field(s) included in the downlink frame. The downlink frame may be a trigger frame. Other methods, apparatus, and computer-readable media are also disclosed.

26 Claims, 14 Drawing Sheets

(56) References Cited

U.S. PATENT DOCUMENTS

| | | | | |
|---|---|---|---|---|
| 2004/0151109 A1* | 8/2004 | Batra | H04B 1/7163 | 370/208 |
| 2005/0111451 A1* | 5/2005 | Kim | H04L 1/0061 | 370/389 |
| 2011/0090844 A1* | 4/2011 | Gong | H04W 52/0238 | 370/328 |
| 2011/0255620 A1* | 10/2011 | Jones, IV | H04L 5/0046 | 375/260 |
| 2014/0029547 A1* | 1/2014 | Seok | H04W 80/02 | 370/329 |
| 2015/0063258 A1* | 3/2015 | Merlin | H04L 47/12 | 370/329 |
| 2015/0237178 A1* | 8/2015 | Zhang | H04L 69/22 | 370/328 |
| 2015/0264161 A1* | 9/2015 | Tian | H04L 69/22 | 370/338 |
| 2016/0056943 A1* | 2/2016 | Stacey | H04L 5/0091 | 370/338 |
| 2016/0066324 A1* | 3/2016 | Li | H04L 69/22 | 370/338 |
| 2016/0105535 A1* | 4/2016 | Kenney | H04L 5/00 | 370/329 |
| 2016/0112851 A1* | 4/2016 | Li | H04L 69/18 | 370/338 |
| 2016/0113016 A1* | 4/2016 | Kim | H04L 1/0053 | 370/312 |
| 2016/0119452 A1* | 4/2016 | Lee | H04L 69/22 | 370/338 |
| 2016/0127233 A1* | 5/2016 | Wentink | H04W 72/1289 | 370/392 |
| 2016/0127948 A1* | 5/2016 | Azizi | H04W 28/18 | 370/338 |
| 2016/0164652 A1* | 6/2016 | Huang | H04W 74/0816 | 370/329 |
| 2016/0174200 A1* | 6/2016 | Seok | H04W 72/04 | 370/329 |
| 2016/0227532 A1* | 8/2016 | Azizi | H04L 69/22 | |
| 2016/0234697 A1* | 8/2016 | Azizi | H04W 4/008 | |
| 2016/0242177 A1* | 8/2016 | Seok | H04W 72/0446 | |
| 2016/0255610 A1* | 9/2016 | Li | H04B 7/0413 | 370/329 |
| 2016/0301501 A1* | 10/2016 | Kenney | H04W 4/008 | |
| 2016/0330300 A1* | 11/2016 | Josiam | H04L 69/22 | |
| 2016/0353483 A1* | 12/2016 | Takagi | H04L 12/413 | |
| 2017/0135040 A1* | 5/2017 | Park | H04W 52/0225 | |
| 2017/0171888 A1* | 6/2017 | Itagaki | H04W 74/0816 | |
| 2017/0187848 A1* | 6/2017 | Itagaki | H04L 69/323 | |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

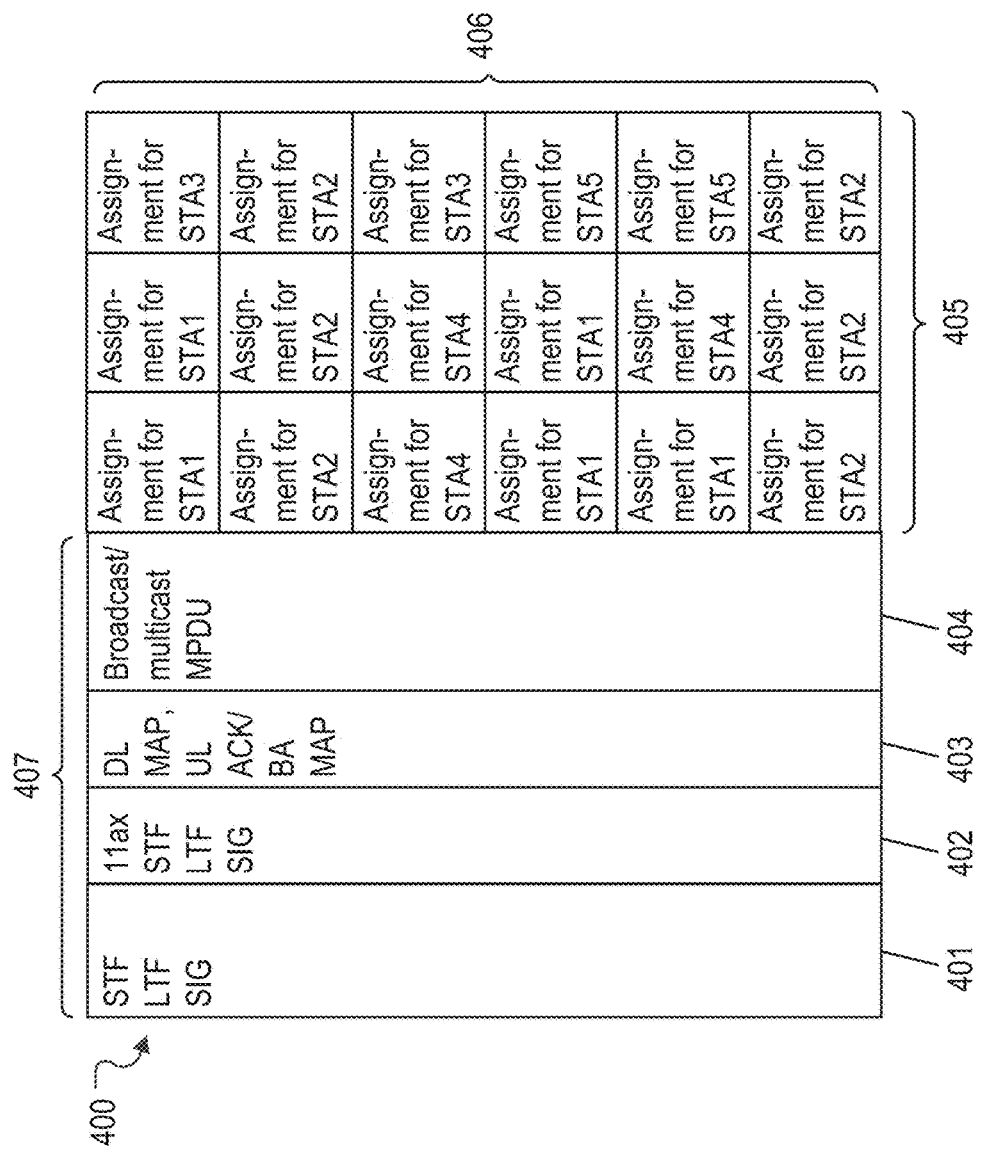

SYSTEMS AND METHODS FOR MULTI-USER RESOURCE ASSIGNMENTS

CROSS-REFERENCE TO RELATED APPLICATIONS

This application claims the benefit of priority from U.S. Provisional Application No. 62/083,136, entitled "DL OFDMA RESOURCE ASSIGNMENT FOR NEXT GENERATION 802.11 DEVICES," filed Nov. 21, 2014, and U.S. Provisional Application No. 62/149,472, entitled "FULL-BAND TRANSMISSION IN DL OFDMA OPERATION," filed Apr. 17, 2015, all of which are incorporated herein by reference in their entirety.

TECHNICAL FIELD

The present description relates in general to wireless communication systems and methods, and more particularly to, for example, without limitation, systems and methods for multi-user resource assignments.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

BRIEF DESCRIPTION OF THE DRAWINGS

FIGS. 4A-4F illustrate schematic diagrams of examples of downlink frames including a downlink map.

Figure 1:
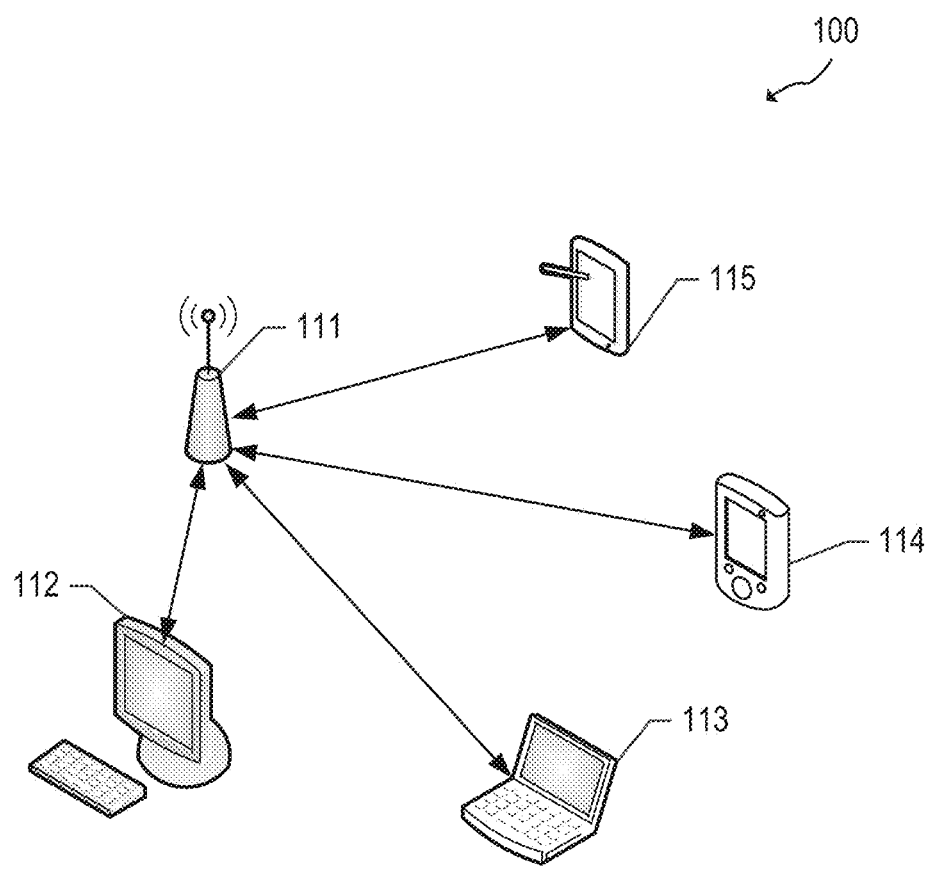
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

New multiuser (MU) transmissions, such as downlink (DL) orthogonal frequency division multiple access (OFDMA) and DL MU multiple-input/multiple-output (MIMO), have received much interest for next-generation WiFi technology. Particularly, OFDMA technology has higher potential since it does not require antenna arrays at an access point (AP). These techniques can be used to enhance the aggregation of multiple packets that are destined to multiple stations (STAs) within the same frame.

In OFDMA, several OFDM symbols are sent consecutively; hence, there is the classic frequency or subcarrier dimension, and there is the time (or OFDM symbol index) dimension. Hence, there is a two-dimensional (2D) time-frequency resource where for unicasting a packet to or from a STA (or a client), a subset of the 2D resource is assigned. While it is possible to assign arbitrary time-frequency regions to each STA that participates in a given DL OFDMA physical layer convergence protocol (PLCP) protocol data unit (PPDU), there would be concerns on the efficiency (of informing the STAs of their allocated 2D resources) as well as possible benefits (such as frequency-selectivity gain) that can be obtained. Hence, in one or more aspects, with DL OFDMA techniques, there come new opportunities and challenges that should be considered in the design of DL OFDMA. Resource allocation per each STA is a choice that attributes to gains and opportunities.

The wireless channel between a pair of STAs is frequency selective, which means the channel magnitude changes over frequency. In the design of DL OFDMA for WiFi and 802.11 systems, it is possible to take advantage of the frequency selectivity of the channel. For instance, the AP can schedule DL transmission for several STAs within a DL OFDMA PPDU, where the information related to a STA is placed on the frequency region that the STA experiences higher channel magnitude. In one or more aspects, it is assumed that the AP has acquired that knowledge (where what frequency tones the STA experiences higher magnitude) ahead of time.

One or more aspects of the present disclosure describe methods that can be used between 802.11 nodes (or any wireless nodes) while they exchange frames in OFDMA format. In OFDMA transmissions, the transmitter node, commonly an AP in 802.11 use cases, sends an OFDMA frame to several other clients. The present disclosure describes methods that allow full-band transmission in conjunction with sub-band transmission in a DL OFDMA PPDU.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a MAC layer and a physical (PHY) layer according to an IEEE 802.11 standard. In the example, at least one wireless communication device (e.g., device 111) is an access point (AP). An AP may be referred to as an AP STA or an AP device. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as a STA. An AP may be, for example, a centralized controller, a base station (BS), a node-B, a base transceiver system (BTS), a site controller, a network adapter, a network interface card (NIC), a router, or the like. An non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, a STA refers to a non-AP HE STA, and an AP refers to a HE AP. In one or more aspects, a STA may act as an AP.

Figure 2:
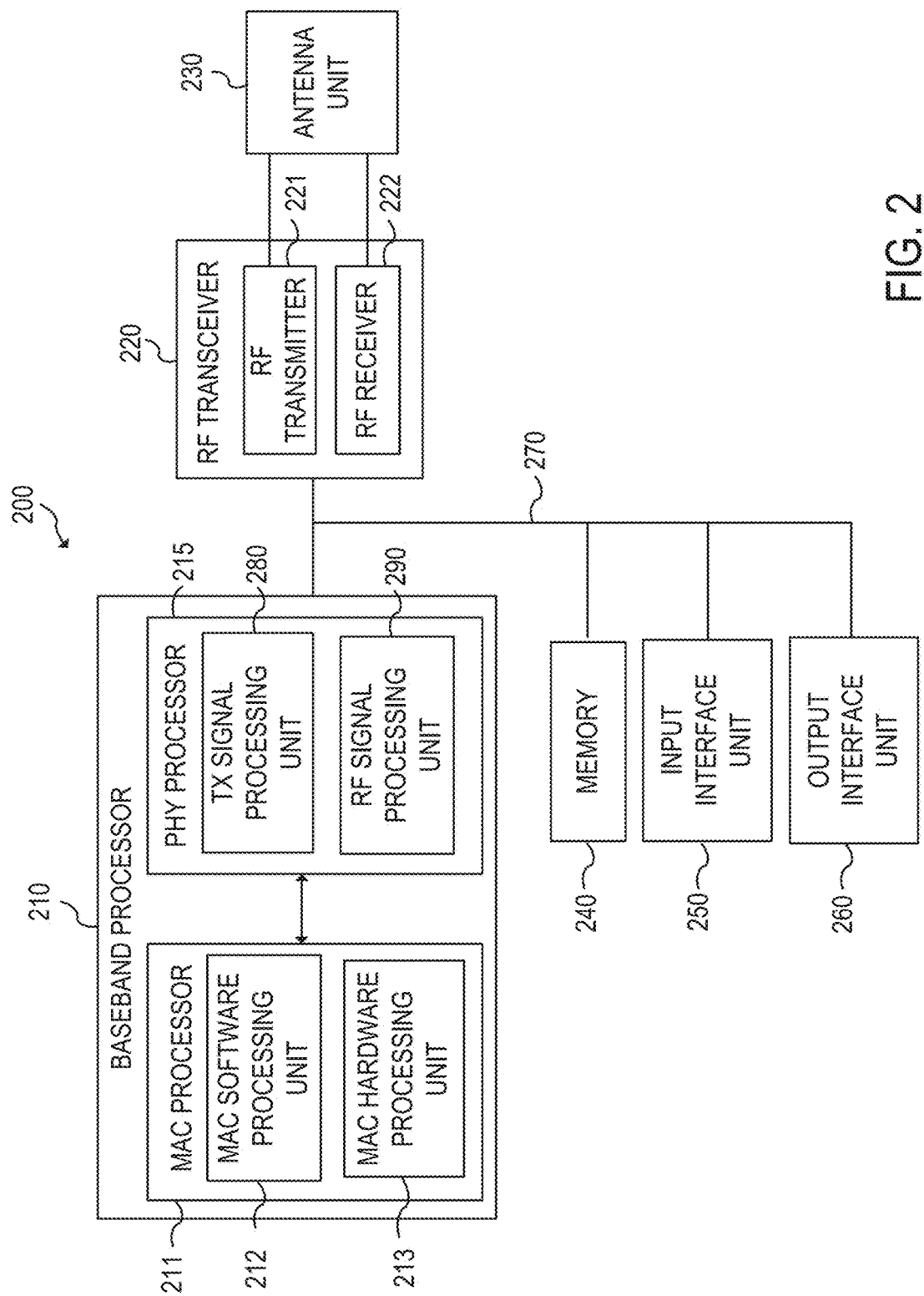
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
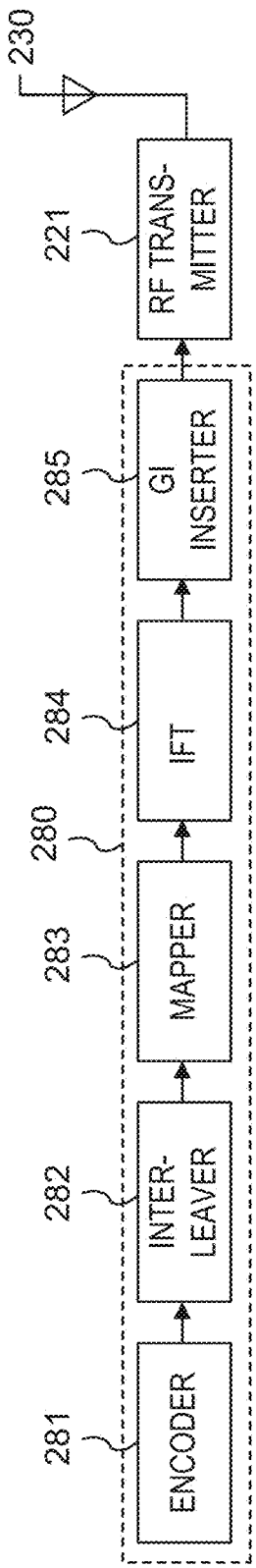
FIG. 3A illustrates a schematic block diagram of an example of a transmitting signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
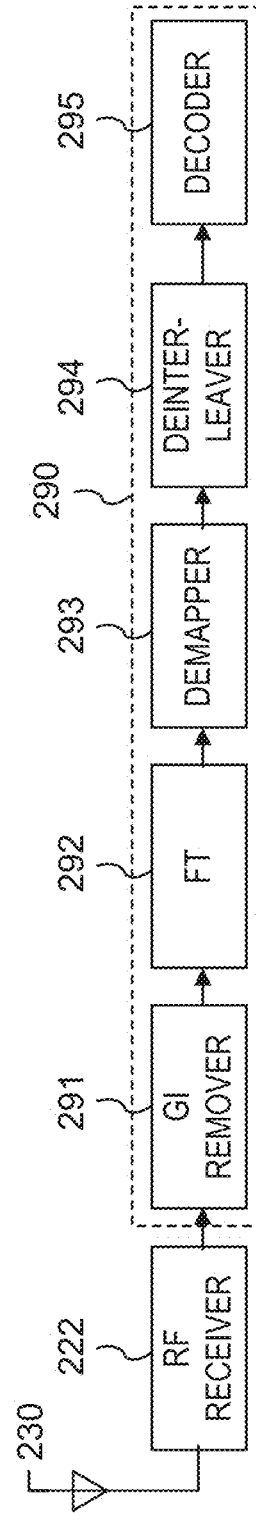
FIG. 3B illustrates a schematic block diagram of an example of a receiving signal processor in a wireless communication device.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may be a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC encoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

FIGS. 4A-4F illustrate schematic diagrams of examples of downlink frames, each including a downlink map.

In one aspect of the disclosure, a frame may refer to an OFDMA frame, a high efficiency (HE) OFDMA frame, an OFDMA PPDU, a HE OFDMA PPDU, a PPDU, a MU PPDU or vice versa. In one aspect, a frame may be a downlink (DL) frame or an uplink (UL) frame. In one aspect, a DL OFDMA PPDU (e.g., 400) includes a header (e.g., 407) and a payload (e.g., 405). In one aspect, HE refers to the IEEE 802.11ax specification, 802.11ax, 11ax or vice versa.

Figure 4A:
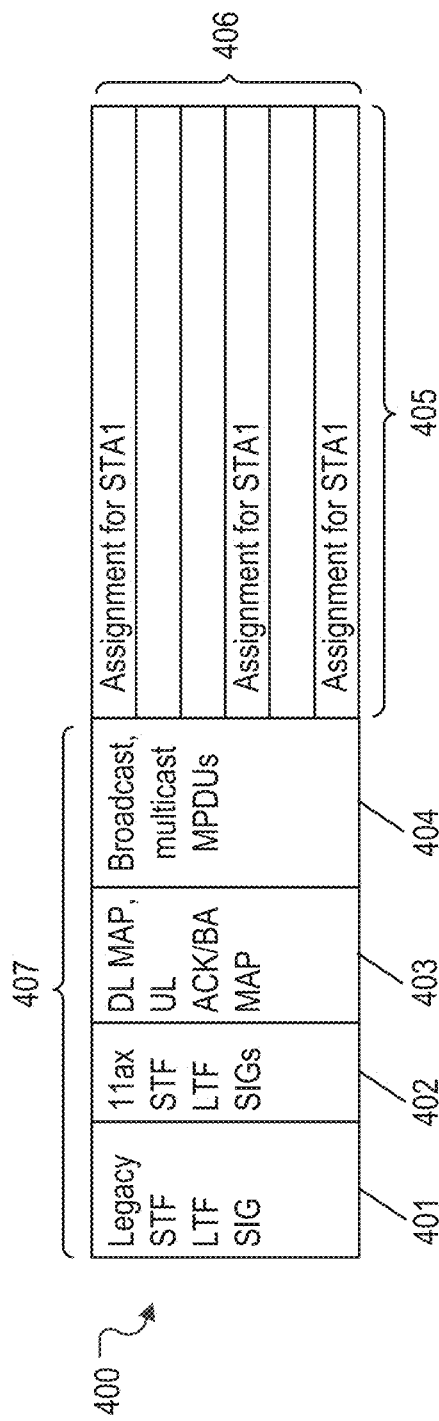

In FIG. 4A, the header 407 of the DL OFDMA PPDU 400 includes legacy short training field, legacy long training field, and legacy signal (Legacy STF/LTF/SIG) portions 401, as well as STF/LTF/SIG portions 402 for next-generation WiFi devices that is noted by 11ax. After these two sets of portions comes a downlink map (DL MAP), followed by an optional region used for broadcast or multicast messages or unicast messages to STAs based on a decision by an AP (e.g., 404). The DL OFDMA PPDU 400 provides a sub-band resource allocation where one or multiple sub-bands 406 are allocated to one STA.

In FIG. 4A, the DL MAP is illustrated as one or more standalone OFDM symbols in a two-dimensional (2D) frequency-time of the DL OFDMA PPDU 400, depending on the size of the DL MAP. The size of the DL MAP 403 may depend on the minimum unit structure of the DL OFDMA PPDU 400 resource allocation. The DL MAP 403 may appear as (a) standalone OFDM symbol(s) (e.g., 403), (b) as a MAC management PDU (MMPDU) and part of the broadcast portion of the DL OFDMA PPDU 400 (e.g., 404), or (c) as one or multiple fields in one or more of IEEE 802.11ax-specific SIG symbols (e.g., 402) such as SIG-B. As used herein, the term "DL MAP" may be another name for one of the 802.11ax-specific SIG symbols (e.g., HE SIG-B).

The DL MAP may include an explicit or implicit indication so that the STAs that are addressed in the DL OFDMA PPDU 400 would send an acknowledgment message (e.g., acknowledgment (ACK)/block acknowledgment (BA)) in a specified format and order indicated by the DL MAP. Hence, along with the DL MAP, the DL OFDMA PPDU 400 includes an implicit or explicit uplink (UL) ACK/BA MAP.

The broadcast/multicast section (e.g., 404) may be optional to the DL OFDMA PPDU 400. This section may occupy multiple OFDM symbols after which the OFDMA section starts. The length of this section may be indicated in one of the 802.11ax-specific SIG symbols (e.g., SIG-A, SIG-B).

The last and main section of the DL OFDMA PPDU 400 is the payload 405 for several STAs that are allocated according to a metric decided by the AP. One such metric is that the AP assigns the time-frequency resources to a STA where the AP contains information that the STA can experience higher channel gain (e.g., assigning the resources at the frequency regions or subcarriers where the STA performs better).

A resource unit (RU) in a 2D frequency-time OFDMA is a region of a given bandwidth (e.g., number of subcarriers) and a given or pre-determined time duration (number of OFDM symbols), where the time duration would be specified in either legacy SIG symbol or in one of the IEEE 802.11ax-specific SIG symbols.

In a general case, the DL MAP can convey information that: (a) enables all STAs to locate the OFDM symbols that contain the broadcast or multicast MAC PDUs (MPDUs), as well as having sufficient information to decode and process the broadcast or multicast MPDUs properly, (b) enables a STA to locate the resource unit(s) assigned to that STA or other STAs and to decode and process the resource units accordingly. However, depending on the RU size and structure of the DL OFDMA PPDU 400, some of this information may be a priori known; hence avoid having to send the information again.

In one or more implementations, the DL MAP can convey any or all of the following information:

a. The starting and ending OFDM symbol number and the modulation and coding scheme (MCS) of the optional broadcast MPDU(s) portion may be listed. Since the segment is optional, there can be a single bit (or part of multi-bit indication) that indicates whether this segment is present or not.

b. The starting and ending OFDM symbol number, and the MCS and group-identifications for multicast MPDUs may be listed. Since the segment is optional, there can be a single bit (or part of multi-bit indication) that indicates whether this segment is present or not.

c. The information related to the payload 405 where MPDUs/aggregate MPDUs (AMPDUs) of several STAs may be placed. For this segment, partial association identifier (PAID), MCS, and list of resource units (RUs) for each STA may be listed.

Figure 4B:
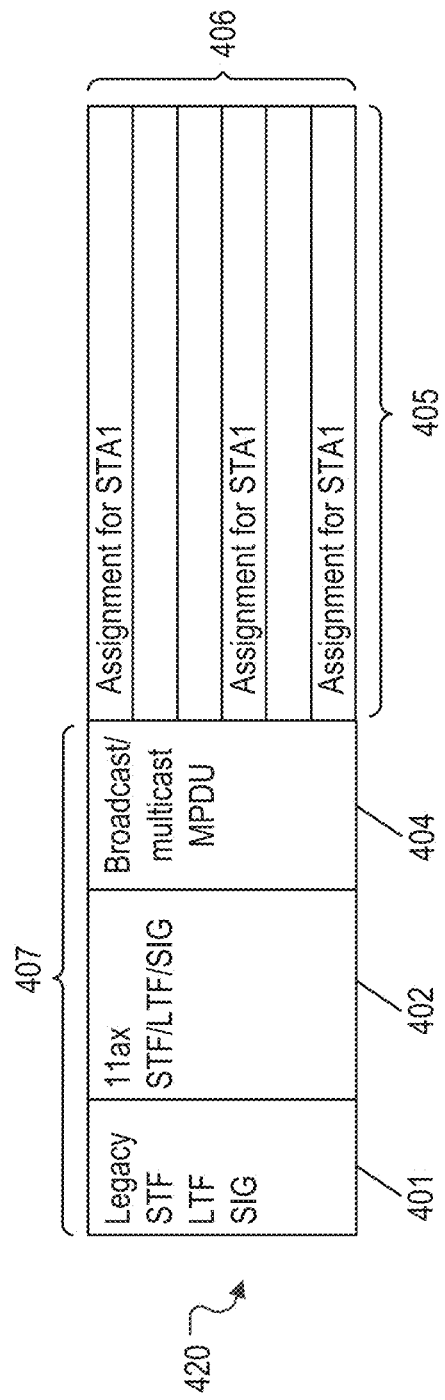
Figure 4C:
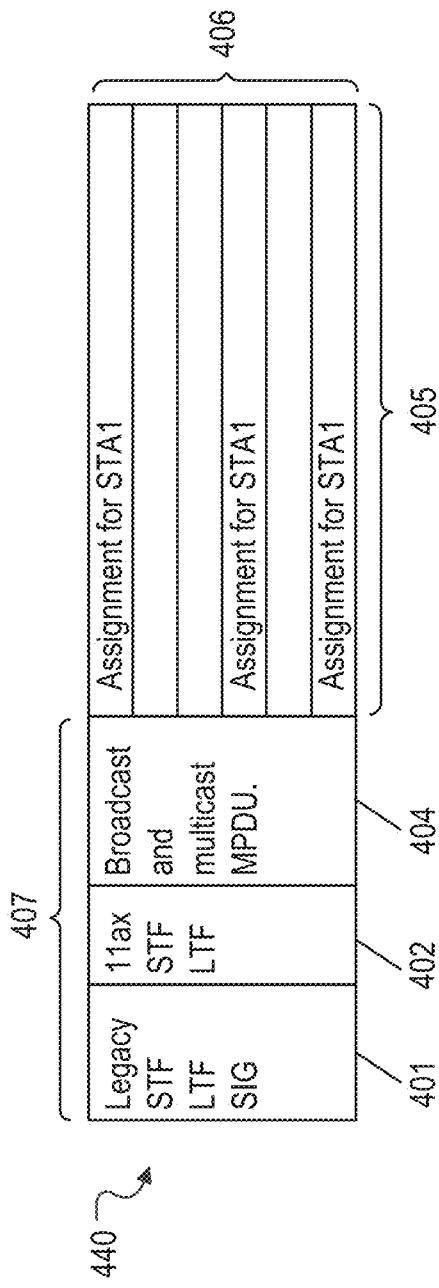

The design of the DL OFDMA PPDU 400 may be assumed to be based on a narrow bandwidth (BW) per RU (e.g., 1 MHz, 2 MHz, etc.); hence, a larger number of RUs can exist per given BW including a larger number of bits being required to indicate each RU. In FIG. 4B, the design of the DL OFDMA PPDU 400 is assumed to be based on a wider BW per RU (e.g., 10 MHz, 5 MHz, 4 MHz); hence a smaller number of RUs can exist per given BW including a smaller number of bits to indicate each RU.

The description for FIG. 4A generally applies to FIGS. 4B through 4F, with examples of differences between FIG. 4A and FIGS. 4B through 4F and other descriptions are provided herein for purposes of clarity and simplicity.

In FIG. 4B, one choice of RU for 802.11ax DL OFDMA PPDU 420 is an RU that has a fixed bandwidth (BW) (specified as the BW in MHz RU) or fixed subcarrier size (specified as the number of subcarriers per RU) and occupies all the OFDM symbols of the payload 405 or OFDMA portion. In some aspects, the BW of each RU is considered to be 20 MHz. In this respect, for an 80 MHz PPDU, there may only be 4 available RUs. In this case, each RU can be assigned to one STA.

Since the indication of the RU can be in a short format, such indication may be provided in one of the 802.11ax SIG symbols (e.g., 402) of the DL OFDMA PPDU 420 of FIG. 4B. The 802.11ax SIG symbols can include fields for DL MAP, and fields for MCS of broadcast/multicast MPDUs. In one implementation, it would suffice to indicate the RU index or indices in addition to PAID of the STA. In another implementation, the AP may announce the identification of the STAs by using group identifications (GIDs). In such group identifications, an order for the STAs may be a priori assumed. For instance, assume a first group identification, G1, is a priori known to be the group identification for $STA_x$, $STA_y$, STAz, and $STA_w$ in the same order. Hence, it may suffice for the AP to announce (a) how many RUs are assigned to each STA in the same order as in the list of STAs, and then (b) announce RU indices in order for these STAs. For instance, assume that the total available RU is 8 (e.g., RUs with 5 MHz bandwidth in a 40 MHz PPDU) identified by RU1, RU2, . . . , RU8 (three bits for each, and total of 24 bits). Then assume that the AP wants to send a DL OFDMA PPDU to $STA_x$, $STA_z$, and $STA_w$ (and nothing for $STA_y$), where:

a. RU1 and RU7 are for $STA_x$ (total of 2 RUs for $STA_x$),
b. (total of 0 RUs for $STA_y$),
c. RU2, RU3 and RU6 are for $STA_z$ (total of 3 RUs for $STA_z$),
d. RU4, RU5 and RU8 are for $STA_w$ (total of 3 RUs for $STA_w$).

Then the AP would need to convey the following numbers: 2, 0, 3, 3, 1, 7, 2, 3, 6, 4, 5, 8 where 2, 0, 3, 3 indicates that there are respectively 2, 0, 3, 3 RUs for $STA_x$, $STA_y$, $STA_z$, and $STA_w$ and {1, 7} is the index of RUs for $STA_x$, {2, 3, 6} is the indices for RUs for $STA_z$, and {4, 5, 8} is the indices of the RUs for $STA_w$.

Assuming that there are N STAs identified by group addressing, and that there are M number of RUs, which can be sufficiently identified by m bits, then the above identification may need the following number of bits: N·m+M·m bits, where m, M and N are positive integer values. In some aspects, the MCS for each STA can be conveyed with these bits. Hence, in this case, the total number of bits needed may be as follows: N·(m+n_MCS)+M·m bits, where n_MCS is the number of bits required to identify MCS and the number of spatial streams (SS).

In one aspect, depending on the values of M (equivalently the value of m) and to less extent the value of N, the total number of bits above maybe conveyed in various forms:

a. If the total number of bits is small, then the total number of bits may be conveyed in one of the SIG fields (see FIG. 4B). Note that in this case, the MCS of the SIG field is a priori known and need not be communicated. In one or more implementations, a further simplified case of the DL OFDMA PPDU may be provided where there is no broadcast/multicast portion immediately following the 802.11ax SIG symbols but rather the payload portion begins, which consists of RUs (see FIG. 4D).

b. Alternatively, the total number of bits maybe conveyed in a separate 802.11ax SIG e.g., denoted by 11 ax-SIG-MAP (see FIG. 4A). Note that in this case, the MCS of the SIG field can be a priori known; hence no need to be communicated. However, it is also possible to have varying MCS for this SIG symbol, in which case the MCS of this SIG would need to be communicated in an earlier 802.11ax SIG symbol such as HE SIG-A.

c. In yet another implementation of the DL MAP information, the total number of bits may be conveyed in a new MMPDU inside the broadcast part segment of the PPDU (e.g., 404) (see FIG. 4C). In this case, the MCS of the broadcast segment is indicated in one of the 802.11ax-specific SIG symbols (e.g., 402).

Figure 4D:
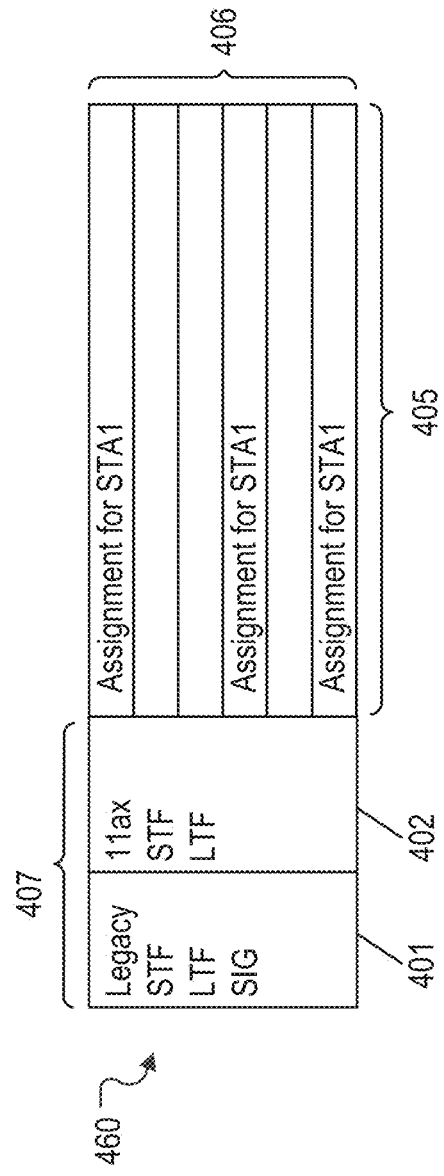

In FIG. 4D, each RU may have a priori known number of subcarriers, but its time duration may be the same time duration as of the payload portion 405 of the PPDU 460. The 802.11ax SIG symbols can include relevant fields for DL MAP, and MAP for UL ACK/BA (e.g., 402). In this example, the DL MAP portion may be sufficiently small in length so that it is indicated via several fields within one or multiple of 802.11ax SIG symbols. In this figure, as an example, the resource allocation for STA1 is shown to be three RUs where each RU has a given number of subcarriers and its time duration is throughout the payload 405 of the PPDU 460.

Referring to FIGS. 4A-4F, in one or more aspects, the DL MAP would need to convey detailed information that allows the STAs to know whether there is any MPDU/AMPDU for them and, if so, where they can locate their MPDU/AMPDU within the payload 405. In one aspect, the information related to the payload segment 405 where MPDUs/AMPDUs of several STAs are placed is as follows: PAID of the STA, MCS, and/or the list of RUs for each STA in order. Another alternative is to use group-identification (instead of PAID) and specify the related information in the same order that a group-identification is defined. For instance, assume group identification G1 is a priori known to be the groups of $STA_x$, $STA_y$, $STA_z$, and $STA_w$ in the same order. Hence, it would suffice for the AP to announce (a) how many RUs are assigned to each STA in the same order as in the list of STAs, and then (b) announce the RU indices in order for these STAs. For instance, assume that the AP desires to send a DL OFDMA PPDU to $STA_x$, $STA_z$, and $STA_w$ (and nothing for $STA_y$), then the AP would need to indicate the number of RUs for each STA in order e.g., [$nRU_x$, 0, $nRU_z$, $nRU_w$], where $nRU_x$ is the number of RUs for $STA_x$, $nRU_y$ is the number of RUs for $STA_y$, and $nRU_w$ is the number of RUs for $STA_w$. In turn, the AP would then need to specify the MCS and number of spatial streams e.g., [$MCS_x$, TBD, $MCS_z$, $MCS_w$] and [$nSS_x$, TBD, $nSS_z$, $nSS_w$], where $MCS_x$ is the MCS index for $STA_x$, $MCS_z$ is the MCS index for $STA_z$, $MCS_w$ is the MCS index for $STA_w$, and TBD is a value that is used to show no or invalid MCS, where $nSS_x$ is the number of spatial streams for $STA_x$, $nSS_z$ is the number of spatial streams for $STA_z$, $nSS_w$ is the number of spatial streams for $STA_w$, and TBD is a value that is used to show no or invalid number of spatial streams. Note that when a STA receives a DL OFDMA PPDU, the STA may generate a response frame for a UL OFDMA PPDU based on the information from the DL OFDMA PPDU.

Figure 4E:
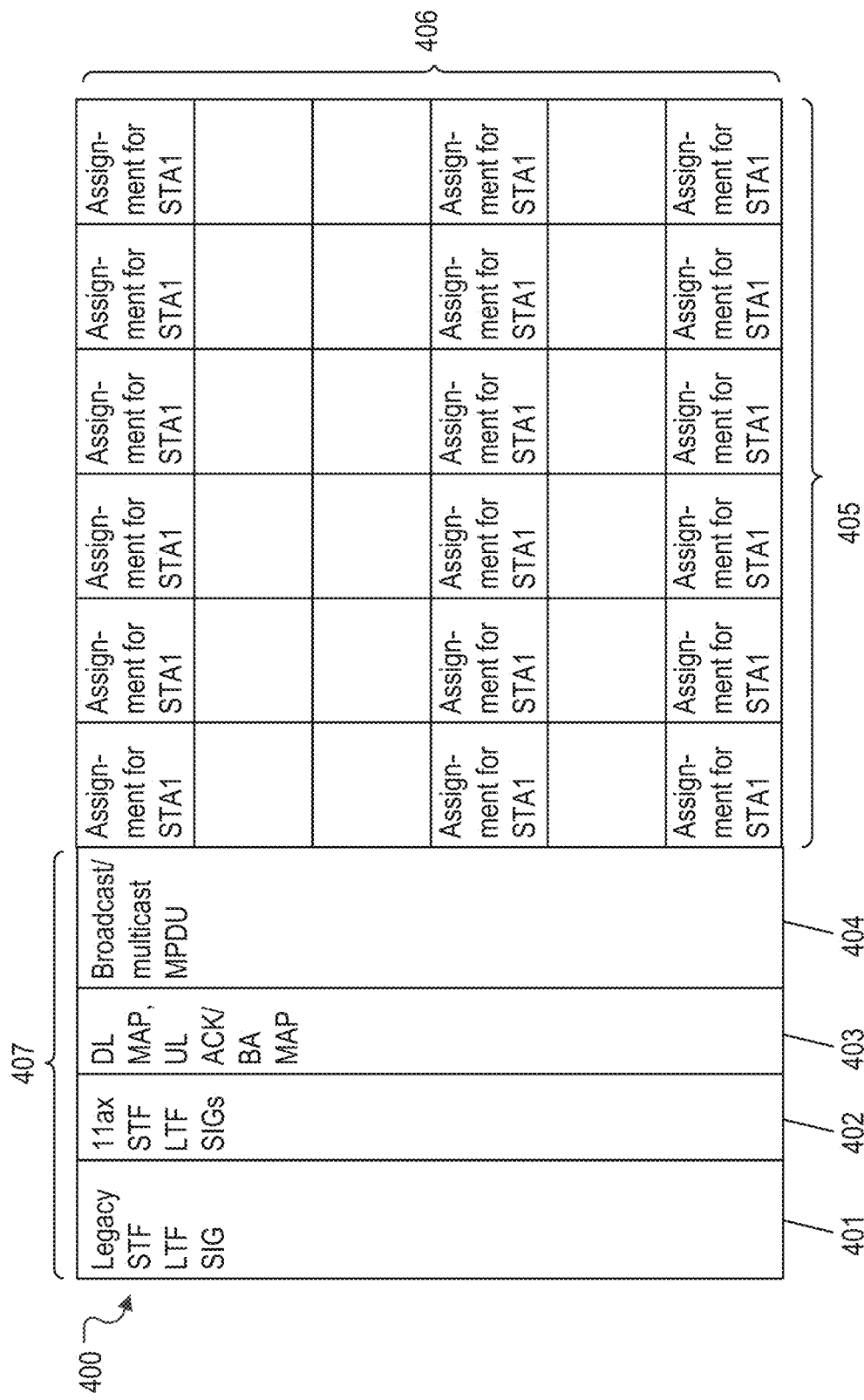

In FIG. 4E, one or multiple sub-bands may be allocated to one STA for a given portion of time (rather than the entire time duration of the payload portion 405). In FIG. 4F, one or multiple sub-bands may be allocated to one or more respective STAs for a given portion of time. Thus, in these aspects, the assigned RU(s) for each STA do not occupy the entire time duration of the payload portion 405 of the DL OFDMA PPDU 400. The assigned RU(s) for each STA and their location in the 2D frequency-time domain may be indicated in the DL MAP segment where all relevant STAs would decode the information first.

In the above descriptions, some examples were provided to explain designs of various parts of a DL OFDMA PPDU structure; however, such designs are meant to be mere examples, and the subject technology is not limited to the same number of STAs, or specific identifications, or specific number of STAs per identifications. Although the description and related figures herein make reference to 802.11ax, the present disclosure is not limited to 802.11 or 802.11ax, and the present disclosure can apply to any next-generation wireless operation that operates in licensed or unlicensed bands.

Figure 5:
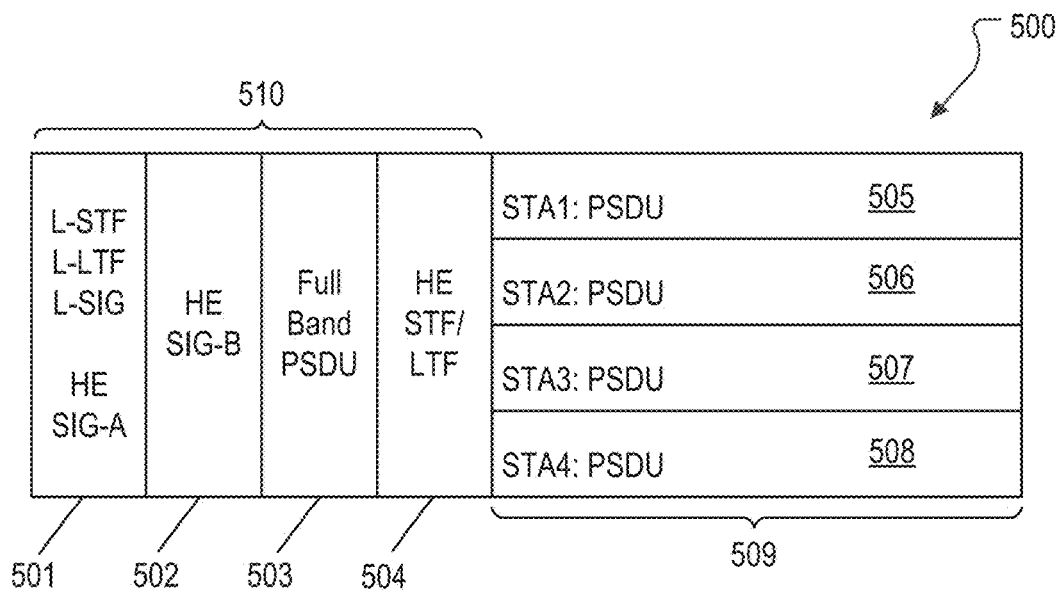
FIGS. 5 and 6 illustrate schematic diagrams of examples of downlink frames carrying resource assignments.
Figure 6:
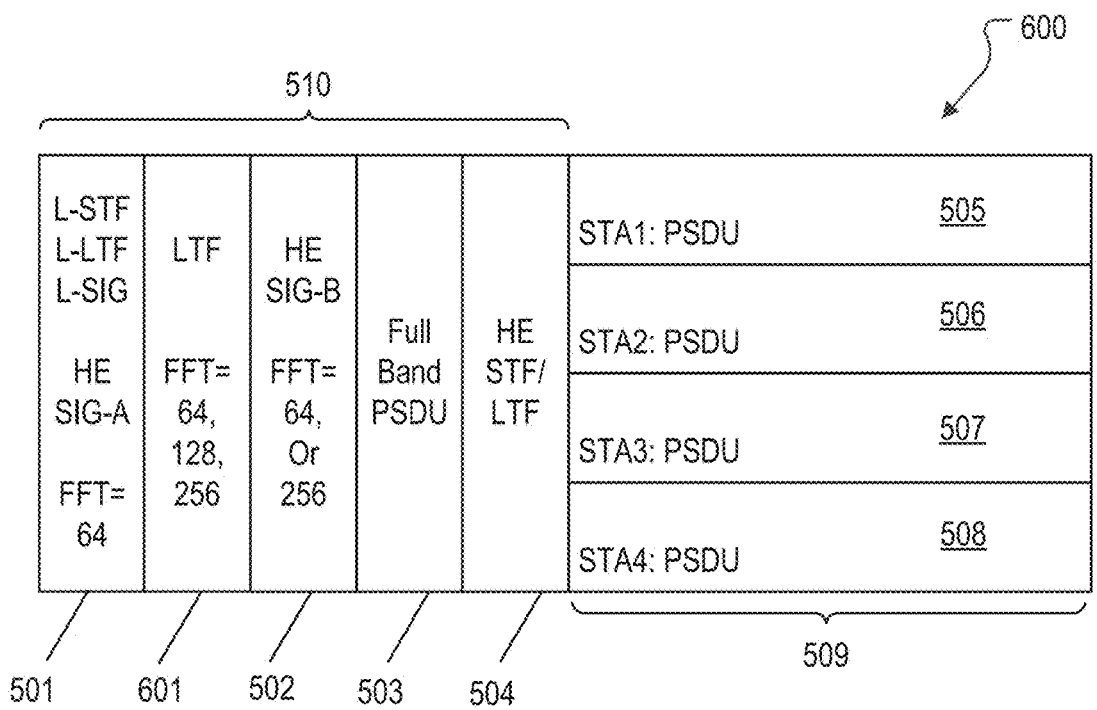

FIGS. 5 and 6 illustrate schematic diagrams of examples of downlink frames carrying resource assignments.

In one aspect, a DL OFDMA PPDU (e.g., 500) includes a header (e.g., 510) and a payload (e.g., 509). In one or more aspects, an AP sends a DL OFDMA frame (e.g., 500) in a HE PPDU format to a set of STAs. In one aspect, a baseband processor 210 (e.g., a PHY processor 215 or a TX signal processing unit 280) generates a DL frame and its components shown in FIG. 5 and causes transmission of the DL frame.

In FIG. 5, the horizontal dimension represents the time dimension or number of OFDM symbols, whereas the vertical dimension represents the frequency dimension, number of tones, or number of sub-carriers. Note that for a given FFT size, the number of tones is given; however, depending on the sub-carrier spacing, two OFDM symbols with e.g., FFT=64 and FFT=256 would occupy the same bandwidth. In one or more implementations, a sub-band refers to a set of contiguous tones or subcarriers that as a whole are assigned for a payload whose expected destination is a single STA, or a set of STAs. In one or more implementations, a sub-band is a horizontal partition of an OFDMA PPDU or frame where a set of contiguous tones for a contiguous set of OFDM symbols are designated for a given payload whose expected destination is a STA or a set of STAs.

A DL OFDMA PPDU may have a predetermined channel bandwidth, e.g., 20 MHz, 40 MHz, 80 MHz, 160 MHz, or 80+80 MHz (i.e., two 80 MHz). A sub-band is a portion of the channel bandwidth of an OFDMA PPDU. For example, when the bandwidth of a PPDU is 20 MHz, and there are four STAs, each of the sub-bands associated with a respective one of the STAs is 5 MHz in bandwidth. When the bandwidth is 40 MHz, each of the four sub-bands associated with a respective one of the four STAs may be 10 MHz in bandwidth. When the bandwidth is 80 MHz, each of the four sub-bands associated with a respective one of the four STAs may be 20 MHz in bandwidth. These are merely examples, and the present disclosure is not limited to these examples. A bandwidth (e.g., 20 MHz, 40 MHz, 80 MHz, 160 MHz, or 80+80 MHz) of a PPDU may be referred to as a PPDU bandwidth, a channel bandwidth, or an overall bandwidth. A bandwidth may refer to a DL bandwidth or a UL bandwidth.

In one aspect, a header is referred to as a preamble header, a preamble, a header section, a header field, or vice versa. For the sake of brevity, a header may refer to a component of a header. Thus, in one aspect, a header may refer to one or more headers (e.g., 501, 502, 503, and/or 504).

Referring to FIG. 5, the header 510 of the DL frame 500 includes a legacy header, which is comprised of a legacy short training field (L-STF), a legacy long training field (L-LTF) and a legacy signal (L-SIG) field (see, e.g., portions of 501). The legacy header contains several symbols based on an early design of an IEEE 802.11 specification. Presence of these symbols would make any new design compatible with the legacy designs and products. In one or more implementations, the legacy STF, LTF and SIG symbols are modulated/carried with FFT size of 64 on a 20 MHz sub-channel and are duplicated every 20 MHz if the PPDU has a bandwidth wider than 20 MHz. Therefore, the legacy field (i.e., the STF, LTF, and SIG fields) occupies the entire channel bandwidth of the DL frame.

In one or more aspects, the header 510 includes a HE SIG-A field (e.g., a portion of 501) and a HE SIG-B field (e.g., 502). These fields contain symbols that carry control information that may be vital regarding each PLCP service data unit (PSDU) and/or regarding the radio frequency (RF), PHY and MAC properties of the PPDU. Several fields may be located either in HE SIG-A and/or HE SIG-B. The HE SIG-A and HE SIG-B symbols may be carried/modulated using a FFT size of 64 or 256 depending on implementation. The HE SIG-A and HE SIG-B fields may occupy the entire channel bandwidth of a PPDU. In some aspects, the HE SIG-B is not always present in all UL OFDMA PPDUs.

The header 510 may further include HE STF and HE LTF fields (e.g., 504), which contain symbols used to perform necessary RF and PHY processing for each PSDU and/or for the whole PPDU. The HE STF/LTF symbols 504 may be modulated/carried with FFT size of 256 and modulated over the entire bandwidth of the DL frame 500. The HE STF/LTF fields may occupy the entire channel bandwidth a PPDU.

The header 510 of the DL frame 500 may include a full-band transmission region, referred to as a full-band physical layer convergence procedure (PLCP) service data unit (PSDU) 503 for unicast or broadcast/multicast PSDU(s), which exist for DL OFDMA PPDUs. In one aspect, the full-band PSDU 503 is an optional region in the DL OFDMA PPDU 500. The full-band PSDU 503 may have a variable length. The full-band PSDU 503 is a region having a set of symbols that covers the whole channel bandwidth of the PPDU but across several OFDM symbols before the start of the sub-band region where each one or multiple sub-bands are assigned to a STA or a set of STAs. In one aspect, if the full-band PSDU 503 is present in the PPDU (e.g., as a part of the header 510), a set of HE STF and/or HE LTF symbols may appear before the full-band PSDU 503 in the PPDU, where the HE STF/LTF symbols are not beam-formed. In some aspects, the full-band PSDU 503 can be carried/modulated using FFT size of 64 or 256 depending on implementation. For example, the full-band PSDU 503 may be carried/modulated using FFT size of 64 as SIG-A, or carried/modulated using FFT size of 256 as the sub-band PSDU(s) region. The full-band PSDU 503 may occupy the entire channel bandwidth of the DL frame.

In FIG. 5, the payload section 509 includes payloads (e.g., PSDUs) assigned to multiple STAs, and is modulated using an FFT size of 256. In this regard, the payloads are associated with STA1, STA2, STA3, and STA4. For example, the PSDU payload 505 is associated with STA1, the PSDU payload 506 is associated with STA2, the PSDU payload 507 is associated with STA3, and the PSDU payload 508 is associated with STA4. In one aspect, each set of sub-bands is associated with its respective PSDU. In one aspect, each set of sub-bands is associated with its respective STA. In one aspect, a set of sub-bands may include one or more sub-bands. In one aspect, a sub-band may include one or more sub-bands. In one example, the number of assigned sets of sub-bands may be the same as the number of STAs associated with the AP. In FIG. 5, the sub-bands assigned to STA1, STA2, STA3, and STA4 have equal bandwidth and the sub-bands are contiguous. For example, the bandwidth of the DL frame may be (a) 20 MHz where each of the sub-bands has a 5 MHz bandwidth, (b) 40 MHz where each of the sub-bands has a 10 MHz bandwidth, or (c) 80 MHz where each of the sub-bands has a 20 MHz bandwidth. However, the procedure described in the present disclosure does not require contiguous or equal bandwidth for sets of assigned sub-bands.

A PSDU for downlink (e.g., each of 505, 506, 507, and 508) is associated with a sub-band of the channel bandwidth of the DL PPDU (e.g., 500) and is modulated using the sub-band rather than the entire channel bandwidth of the DL PPDU. In one aspect, the modulation involves inverse Fourier transformation performed, for example, by an inverse Fourier transformer 284 in FIG. 3A. In one or more aspects, the bandwidth assigned to payloads (e.g., 505, 506, 507 and 508) to STAs depend on, for example, the payload size and the MCS and number of spatial streams that the AP decides for the sub-band transmission, and the overall consideration that the AP need to make to approximately align the length/duration of various PSDU sub-bands.

In one or more implementations, each PSDU contains a payload directed to a STA including corresponding MAC/PHY padding. The broadcast PSDU(s), located in the full-band PSDU region 503, are intended for all the STAs that are associated with the AP. The presence and length of such PSDU(s) are indicated in the HE SIG-A field (see, e.g., a portion of 501) and/or the HE SIG-B field 502. The multicast PSDU(s), located in the full-band PSDU 503, are intended for a set of STAs that are associated with the AP. The presence and length of such PSDU(s) and the set of STAs that each multicast PSDU is destined to is indicated in the HE SIG-A field and/or the HE SIG-B field. The unicast PSDU(s), typically located in the sub-band region of a PPDU (e.g., in the payload 509), are destined to a STA that is associated with the AP. The presence and length of a PSDU in a sub-band or a set of sub-bands and the STA that is a recipient of the unicast PSDU are indicated in the HE SIG-A field and/or the HE SIG-B field. In one aspect, one or more of unicast PSDU(s) may be located in the full-band PSDU 503 and the rest of the unicast PSDU(s) are present in the sub-band PSDU 509.

FIG. 6 illustrates a schematic diagram of an example of a downlink (DL) frame. FIG. 6 shows a DL frame 600 that is similar to the DL frame 500 of FIG. 5, except, for example, that there is an LTF 601 prior to the HE SIG-B 502. Examples of differences between FIG. 5 and FIG. 6 and other descriptions are provided herein for purposes of clarity and simplicity. Referring to FIG. 6, in one or more implementations, the HE SIG-A 501 is modulated/carried with FFT=64 and is encoded for 20 MHz bandwidth (but duplicated to all 20 MHz sub-channels where the whole DL OFDMA PPDU 600 operates) while the HE SIG-B 502 is modulated/carried with the same FFT=64 or perhaps larger FFT size such as FFT=128 or FFT=256, and is encoded across the full channel bandwidth of the DL OFDMA PPDU 600. In some aspects, if the DL OFDMA PPDU 600 is 80 MHz, the HE SIG-B 502 is also encoded across 20 MHz (with different and/or duplicated content in each 20 MHz sub-channel), 40 MHz (with different or duplicated content in each 40 MHz sub-channel) or 80 MHz. As shown in FIG. 6, the full-band PSDU region 503 follows the HE SIG-B 502, which offers the advantage that the LTF 601, which is located immediately before the HE SIG-B 502, can be used to decode the HE SIG-B 502 and the full-band PSDUs 503. Note that the LTF 601 that is immediately before the HE SIG-B 502 may be modulated/carried with FFT=64, 128 or 256, depending on a tradeoff between overhead and frequency resolution. After the full-band PSDU 503, a set of HE STF and HE LTF 504 and sub-band transmission region 509 may follow. In one aspect, the channel bandwidth in FIG. 6 can be 20 MHz, where each of the sub-bands has 5 MHz bandwidth, 40 MHz where each of the sub-bands has 10 MHz bandwidth, or 80 MHz where each of the sub-bands has 20 MHz bandwidth.

Referring to FIGS. 5 and 6, in one aspect, the attributes of the full-band and sub-band PSDUs are carried in the HE SIG-A 501 and the HE SIG-B 502. For the optional full-band region 503, there is a sub-field that can have a single-bit where it identifies whether the full-band region 503 is present or not. This sub-field may be denoted as FullbandTX. In some implementations, FullbandTX may have a 1-bit length. In this respect, if FullbandTX is set to zero, then this field indicates that the full-band region 503 does not exist within the DL OFDMA PPDU. On the other hand, if FullbandTX is set to one, then this field means that the full-band region 503 exists within the DL OFDMA PPDU.

In one aspect, the presence of full-band PSDU region 503 in FIGS. 5 and 6 means that the FullbandTX field in the HE SIG-A 501 is set to one to indicate that there is a full-band PSDU region 503. In another implementation, the number of OFDM symbols of the full-band region 503 is also carried in the HE SIG-A 501 and possibly in FullbandTX or as a subfield of FullbandTX. In yet another implementation, the FullbandTX length can be two bits such that the encoding shows whether the full-band region 503 exists, and if it does, whether it has unicast, multicast or broadcast PSDU; e.g., FullbandTX=0 (not present), FullbandTX=1 (unicast), FullbandTX=2 (multicast), FullbandTX=3 (broadcast). If FullbandTX=0, e.g., it indicates that the full-band PSDU 503 does not exist, then no attribute for the full-band PSDU 503 is carried subsequently (nor in the HE SIG-A 501 and neither in the HE SIG-B 502). If FullbandTX indicates that there is a full-band PSDU region 503, then the attributes and the duration (and, in one implementation, the number of OFDM symbols) of the full-band PSDU region 503 is indicated in the HE SIG-B 502.

In one aspect, the full-band PSDU attributes that are indicated in HE SIG-B may include the following: identifier (ID) (e.g., AID/PAID or Multicast ID), MCS, Coding, STBC, length, and number of OFDM symbols that the full-band PSDU 503 occupies. Note that the number of OFDM symbols may not be present since it can be obtained from other variables such as MCS, length and the PPDU bandwidth. Also, note that AID/PAID may be represented by shorter versions in a unique way that identify the destined STA. Furthermore, note that ID is a general reference to any ID that either identifies a single STA (for unicast frames), identifies a set of STAs (for multicast frames) or identifies all the associated STAs (e.g., set to a pre-known IDs that are identical to broadcast such as an all-zero ID). Note that the unicast versus multicast identification may be recognized by definition of the IDs when the AP has announced them, or they may be recognized using the FullbandTX field in the HE SIG-A 501, which indicates whether the full-band region 503 carries a unicast or multicast frame. In such case, the length of the ID can vary depending on whether the full-band PSDU 503 is a unicast, multicast or broadcast PSDU. For instance, in the case that the full-band PSDU 503 carries a broadcast PSDU, in one aspect, there is no ID indicated in the HE SIG-B region 502 since it is already indicated in the HE SIG-A 501 by the FullbandTX being set to broadcast.

Figure 7A:
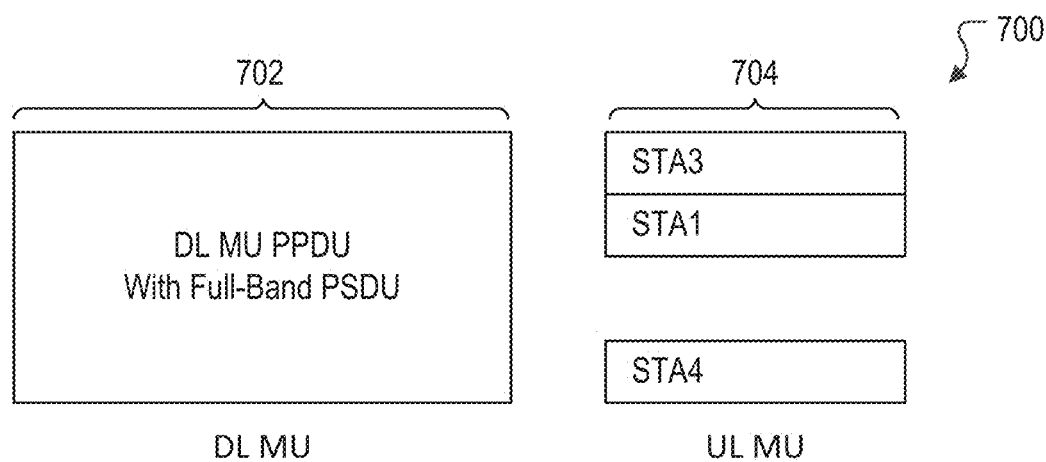
FIGS. 7A and 7B illustrate schematic diagrams of examples of downlink and uplink frames in frame exchanges.
Figure 7B:
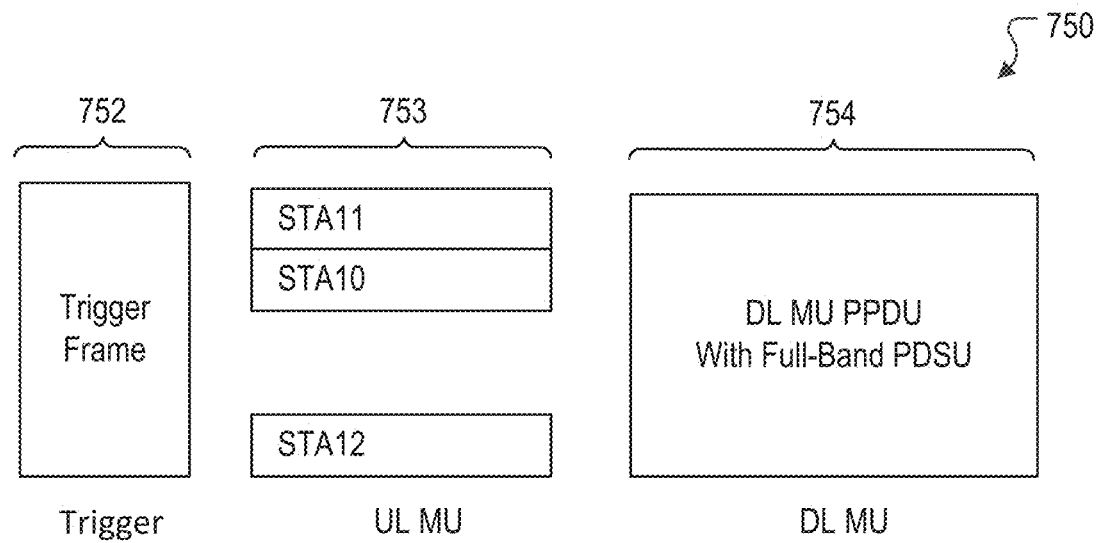

FIGS. 7A and 7B illustrate schematic diagrams of examples of downlink and uplink frames in frame exchanges 700 and 750. In FIG. 7A, a DL MU PPDU 702 may be similar to a frame 500 or 600, and the DL MU PPDU 702 may include a full-band PSDU (e.g., 503) that is a trigger frame that has scheduling information for the subsequent ACK/BA responses in a UL MU PPDU 704 from STAs (e.g., STA1, STA3 and STA4), or may include a sub-band PSDU in the DL MU PPDU 702 that is a trigger frame that has scheduling information for the subsequent ACK/BA responses in a UL MU PPDU 704 from STAs (e.g., STA1, STA3 and STA4). In FIG. 7B, after an AP sends a trigger frame 752, a UL MU PPDU 753 (including frames from STA10, STA11 and STA12) may be sent in response to the AP. The AP may then send a DL MU PPDU 754 (which is similar to a frame 500 or 600). In this case, the DL MU PPDU 754 may include a full-band PSDU (e.g., 503) that is the ACK/BA response(s) to the UL MU PPDU 753, or the DL MU PPDU 754 may include a sub-band PSDU (e.g., any sub-band PSDU in 509) that is the ACK/BA response(s) to the UL MU PPDU 753. A DL MU PPDU may be a DL OFDMA PPDU or a DL MU MIMO PPDU, and a MU UL PPDU may be a UL OFDMA PPDU or a UL MU MIMO PPDU.

In an example, a full-band PSDU region (e.g., full-band PSDU 503 of FIGS. 5 and 6) may be used by the AP to send a management or control frame (e.g., 702 or 754) to a single STA or a set of STAs. The full-band PSDU may carry an MPDU or MMPDU for all the STAs that are subject to one of the PSDUs in the sub-band region. For instance, referring to FIGS. 5 and 6, where there are 4 sub-bands and each sub-band carries a PSDU for one of the STAs {STA1, STA2, STA3, STA4}, the full-band PSDU may carry a payload for all of the STAs in {STA1, STA2, STA3, STA4}. Such case can also be indicated in a special manner such as by specific ID, e.g., an all-zero or all-one ID, indicating that all the STA that have a payload in the sub-band region need to process the payload in the full-band region as well. The payload that is carried for all the STAs in {STA1, STA2, STA3, STA4} can vary. In one implementation, this payload (e.g., payload in DL MU PPDU 702) may contain necessary information to inform the STAs in {STA1, STA2, STA3, STA4} how to multiplex their ACK or BA reply in the subsequent UL OFDMA or UL MU MIMO PPDU (e.g., 704 in FIG. 7A). In other implementations, the payload may have necessary information to inform the STAs in {STA1, STA2, STA3, STA4} to start sending data frames, management frames, or control frames in the immediately subsequent UL OFDMA or UL MU MIMO PPDU (e.g., 704), which indicates that the full-band region 503 contains a Trigger frame for a set of STAs including the STAs that have a payload in the sub-band region i.e., {STA1, STA2, STA3, STA4}. The necessary information that is referred to in these examples can be: total duration allowed of the subsequent UL MU or OFDMA frame (e.g., 704), per-STA MCS, per-STA AID/PAID or any other shorter ID, or group identification.

In another instance, the full-band PSDU may carry an MPDU, MMPDU or control frame for all of a set of STAs such as a multi-STA ACK/BA frame (e.g., 754 in FIG. 7B) to a set of STAs that in the preceding frame have sent a UL MU MIMO or UL OFDMA frame (e.g., 753) to the AP (in response to a trigger frame 752). In one aspect, the STAs that are expected to receive the full-band PSDU may not have any other payload in the sub-band region. This instance is for the cases where an AP sends a multi-STA ACK/BA frame (e.g., 754) to a set of STAs and then in the same DL OFDMA PPDU (e.g., 754) sends several payloads to another set of STAs.

In another example, the full-band PSDU region may be used by the AP to send a management frame to a single STA or a set of STAs. For instance, the AP may decide to send a management frame such as Probe Response, Association Response or Reassociation Response to a STA that has just attempted to probe the AP or requested association. Since the AP may not have any frequency selectivity status of the STA (i.e., the AP would not know in what sub-bands the STA has better signal reception strength than other sub-bands), in one aspect, the AP may be unable to reliably decide which sub-band is best for the STA. Hence, the best decision for the AP is to use a reliable full-band transmission as in the full-band PSDU region to send the management frame to the STA. Similarly, the AP may send a Disassociation frame (in the full-band PSDU region) to a STA, and send payloads to other STAs in some of the other sub-bands.

In yet another example, the full-band PSDU may carry a control frame (such as a clear-to-send (CTS)-to-self frame) that contains general information for unintended or third-party STAs to extract vital WLAN-level information such as the Duration or network allocation vector (NAV) information. Alternatively, it is also possible that the TXOP duration information or NAV information is carried in an HE SIG symbol, such as HE SIG-A or SIG-B (e.g., HE SIG-A 501 and HE SIG-B 502 of FIG. 5 or 6). In such case, in one aspect, the Duration or TXOP Duration field that is expected to be carried in HE SIG shall be set to the same value as in the Duration field of the MAC header of all the MPDUs that are carried in each sub-band. In some embodiments, the TXOP Duration field in HE SIG may have a fewer number of bits compared to the Duration field in the MAC header of each MPDU. In such an embodiment, the TXOP Duration field in HE SIG shall be set to the same value as the Duration field of the MAC header of all the MPDUs that are carried in each sub-band, excluding the least significant bits (LSBs) that do not fit in the TXOP Duration field in the HE SIG. In other words, if the TXOP Duration field in the HE SIG field of an MU PPDU has a length of M bits, then the M MSBs (most significant bits) of the Duration fields in the MAC header of the MPDUs carried in the MU PPDU are copied to the TXOP Duration field in the HE SIG. In another embodiment, when the length of the TXOP Duration field in the HE SIG field is different than the length of the Duration in the MAC header of MPDUs, then the TXOP Duration field in the HE SIG field is expressed in the time unit of TimeUnit1 while the Duration field in the MAC header of MPDUs is expressed in the time unit of TimeUnit0, where TimeUnit0 may be 1 microsecond and TimeUnit1 may be 2, 4, 8, 9, 15, or 16 microseconds. The times indicated in the Duration fields in a HE SIG symbol and the MAC header are calculated in the associated time units. If a calculated duration includes a fractional of the associated time unit, that value inserted in the Duration field in the HE SIG symbol and MAC header is rounded up to the next higher integer. If a calculated duration results in a negative value, the value of the Duration field in the HE SIG symbol and MAC header is 0. Regardless of presence of the TXOP Duration field in HE SIG, in one aspect, the Duration field of the MAC header of all of MPDUs that are carried in each sub-band of an MU PPDU shall be equal and set to the same value. This ensures that all the STAs that are receiving a payload in MU PPDU sub-band region have the same Duration across all sub-bands as well as unintended STAs also have the same Duration value.

There are multiple choices for the full-band PSDU FFT and length. One design choice for FFT size depends on whether the full-band PSDU follows the same FFT size as in HE SIG-B, whether the full-band PSDU follows the FFT size of the HE LTF (e.g., HE LTF 601 of FIG. 6) or whether the full-band PSDU follows the FFT size of the sub-band PSDUs. All of these implementations satisfy some tradeoffs. Another design option is to have a dynamic OFDM symbol length (equivalently dynamic FFT size) for the full-band PSDU region where depending on the length of the content of the full-band PSDU, it may be beneficial to use longer or shorter OFDM symbol length. For instance, if the length of the content of the full-band PSDU fits an OFDM symbol with FFT=64 or FFT=128, then instead of excessive MAC and PHY padding in order to increase the size to the equivalence of FFT=256, it may be advantageous to carry the full-band PSDU in FFT=64 or FFT=128. Note that in order to so, one implementation may use the same FFT=256 but instead use every other tone (and leave other tones empty) which makes the outcome equivalent to FFT=128. Similarly for FFT=256, if every third tone is used and other tones in between are left empty (e.g., tone t0 is used to place a symbol but tones t0+1, t0+2 and t0+3 are left empty such that no symbol is placed on these tones and a symbol is placed at tone t0+4), it makes the outcome equivalent to FFT=64.

Figure 8A:
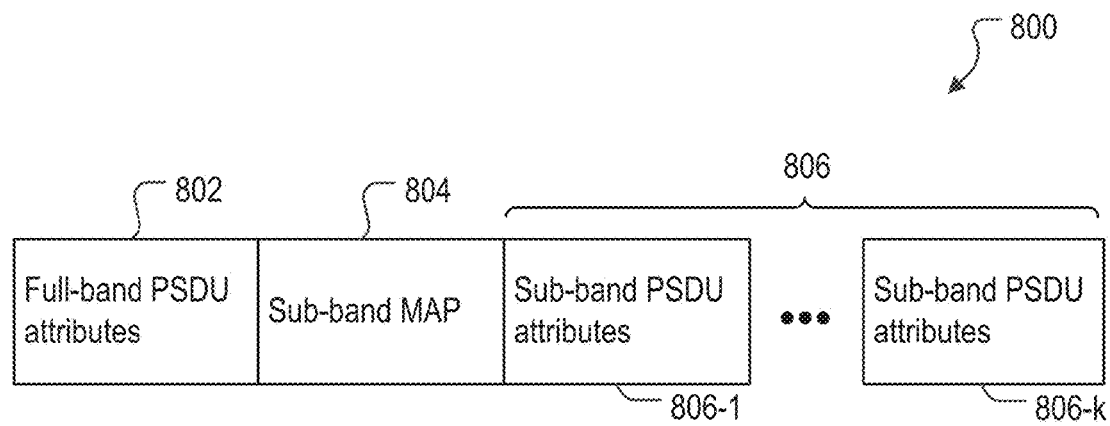
FIGS. 8A and 8B illustrate schematic diagrams of examples of the content of a signal-B (SIG-B) field in a frame.
Figure 8B:
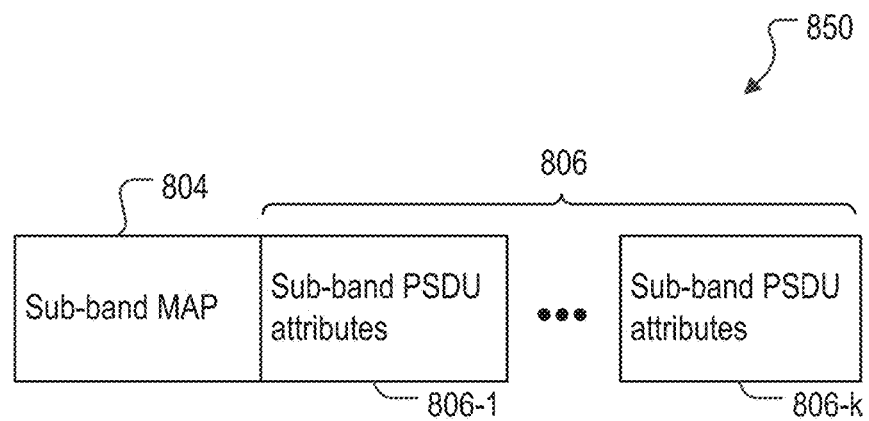

FIGS. 8A and 8B illustrate schematic diagrams of examples of SIG-B content in a frame. In one implementation, as shown in FIG. 8A, the HE SIG-B (e.g., HE SIG-B 502 of FIG. 5) contains PSDU attributes of the full-band PSDU (e.g., full-band PSDU 503) as described above, and it contains PSDU attributes of the sub-band PSDUs as well. These attributes can be indicated in multiple ways. The sequence of data can appear in HE SIG-B. In this example, the attributes of the full-band PSDU (see, e.g., a full-band PSDU attributes field 802) appear if the full-band PSDU exists (e.g., if FullbandTX in HE SIG-A indicates that there is a full-band PSDU), and then the attributes of all the sub-band PSDUs (see, e.g., sub-band PSDU attributes field 806, which includes sub-band PSDU attributes sub-fields 806-1 through 806-$k$, where k is an integer number) appear in some order. This order is indicated in a "sub-band map" (e.g., sub-band MAP 804) that shows which sub-band arrangement has been used in a corresponding PPDU and which sub-bands are occupied. Hence, only the attributes for the occupied sub-bands are subsequently listed in HE SIG-B and the attributes of the sub-bands that are indicated as empty will not appear in HE SIG-B, thereby consuming no bits. FIG. 8B illustrates an example of SIG-B content that is the same as FIG. 8A, except that the full-band PSDU is not present (e.g., if FullbandTX in HE SIG-A indicates that there is no full-band PSDU). Note that the sub-band PSDU attributes field 806 may also be referred to as Per-User Info, Per-User Attributes, Per-STA Info, Per-STA Attributes, User-Specific field, or STA-Specific field. The Sub-band MAP may be referred to as Common field or Common Info.

With reference to FIGS. 8A and 8B as well as FIGS. 5 and 6 (but with a modified description as follows), if as an example the AP assigns only the top and the bottom sub-bands to STA1 and STA4 (e.g., 505 and 508) and leaves the other sub-bands empty (e.g., 506 and 507), then the sub-band MAP 804 indicates that only the top and the bottom sub-bands have non-empty assignment. Subsequently, only the attributes for the top and bottom PSDUs appear in some pre-known order, e.g., from low to high sub-band index such that first "PSDU attributes" indicates the attributes of the sub-band with a smallest index, and second "PSDU attributes" indicates the attributes of a next non-empty sub-band index. There are multiple ways to perform encoding for the sub-band MAP 804. Note that in one aspect, an objective is to have an encoding that is more compact than specifying the index of each of the non-empty sub-bands. In one or more implementations, one solution is to enumerate all the possibilities in a manner only to indicate each possibility by an index. For instance, referring to FIGS. 5 and 6, there may be 15 cases where the AP may perform sub-band assignment such that each sub-band can be empty or non-empty independently than other sub-bands. Since these 15 cases are a priori known to the AP and each STA, the AP may only announce each case simply by a four-bit field. In a benchmark case, an AP identifies a sub-band by a two-bit field since there are a total of four sub-bands (see FIGS. 5 and 6) and the two-bit field suffices to identify each sub-band. Comparing to the benchmark case (which needs in total 4×2 bits=8 bits), the solution described above requires a four-bit field. Note that the foregoing description is an explanation for the sub-bands in the example shown in FIGS. 5 and 6; however, the method can be generalized to perform a full indexing of any sub-band combination possibilities.

Note that in general the "PSDU attributes" can be attributes of a single user (SU) PSDU or MU PSDU (e.g., whether the PSDU in a given sub-band is a SU PSDU or a MU PSDU such as DL MU MIMO) where for each case the content of the attributes are encoded differently. However, in order to allow possibility of both MU and SU PSDU, each PSDU attribute can start with a field that indicates whether the PSDU attribute is SU or MU. In one aspect, such field can have a single-bit length and is denoted as "SUorMU" subfield (not shown).

In one or more implementations, the "SU PSDU attributes" field contains one or more sub-fields such as: MCS (4 bits), AID (12 bits), Coding (1 bit), number of space-time streams (NSTS) (3 bits), space-time block coding (STBC) (1 bit), and/or SU-Beamformed (1 bit). In other implementations, instead of AID, Partial AID (PAID) may be used, or any other identification that the AP may have announced in the preceding Beacon frame(s) or even the length of the short AID can be indicated in HE SIG-A (e.g., the HE SIG-A 501 of FIG. 5 or 6) of the same DL OFDMA PPDU. In such abbreviated identification of the AIDs, in one aspect, the AP shall verify and select a length that is shorter than AID, but not too short that can cause the identification of two STAs (that have payloads in the same DL OFDMA PPDU) become the same. The AP can select the length for the AID that ensures all of the STAs that have payloads in the DL OFDMA PPDU are uniquely identified.

Given the above descriptions for a full-band PSDU attributes field 802, a sub-band MAP field 804, and a sub-band PSDU attributes field 806 (e.g., SU PSDU attributes, MU PSDU attributes), examples of a sequence of possible fields in HE SIG-B are as follows. In one aspect, referring to FIGS. 5 and 6 where there are four non-empty sub-bands carrying payloads to {STA1, STA2, STA3 STA4}, the full-band PSDU 503 can carry a frame to STA0, and the FullbandTX field in the HE SIG-A 501 is set to 1 to indicate that there is a full-band PSDU present, then the sequence of fields in the HE SIG-B 502 is, for instance: {full-band PSDU attributes for STA0}, followed by {Sub-band MAP, which indicates the case that all of the four sub-bands are non-empty}, followed by {sub-band PSDU attributes for STA1}, followed by {sub-band PSDU attributes for STA2}, followed by {sub-band PSDU attributes for STA3}, followed by {sub-band PSDU attributes for STA4}. Note that the sub-band PSDU attributes 806 are placed in a pre-known order e.g., from low to high sub-band index, but only for those sub-bands that are not empty (or alternatively a reserved set of bits is used to replace sub-band PSDU attributes for an empty sub-band). In other aspects, the sub-band PSDU attributes 806 are placed in an order of an increasing frequency sequence or a decreasing frequency sequence. Note that, in one aspect, the purpose of the sub-band MAP 804 is to identify occupied and empty sub-bands in a unique way, and the encoding of the sub-band MAP 804 can be similar to the encoding described above, or other types of compact encoding.

Figure 9A:
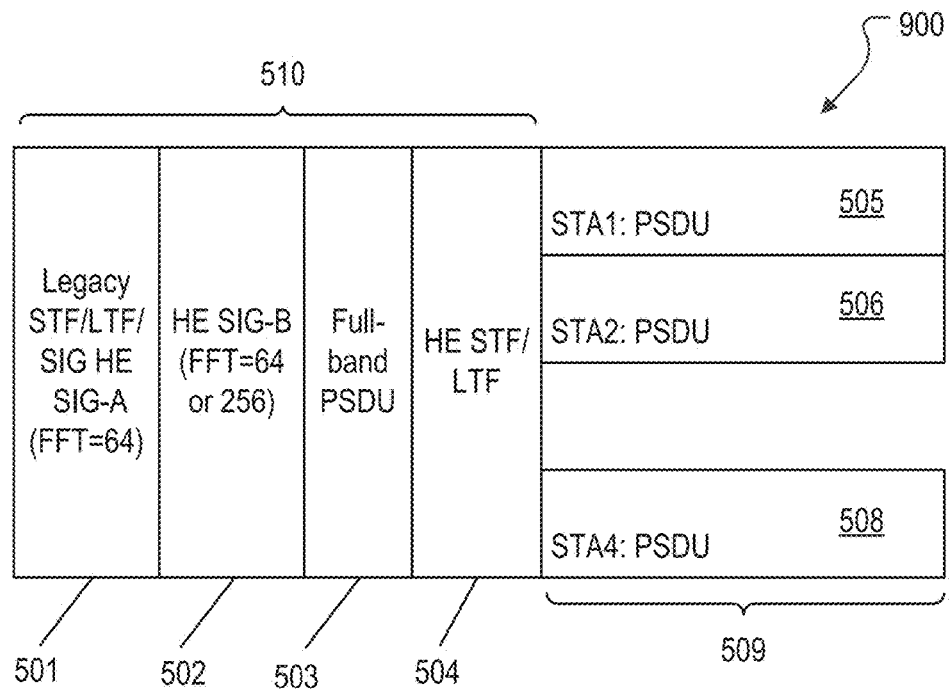
FIGS. 9A and 9B illustrate schematic diagrams of examples of downlink frames carrying resource assignments.
Figure 9B:
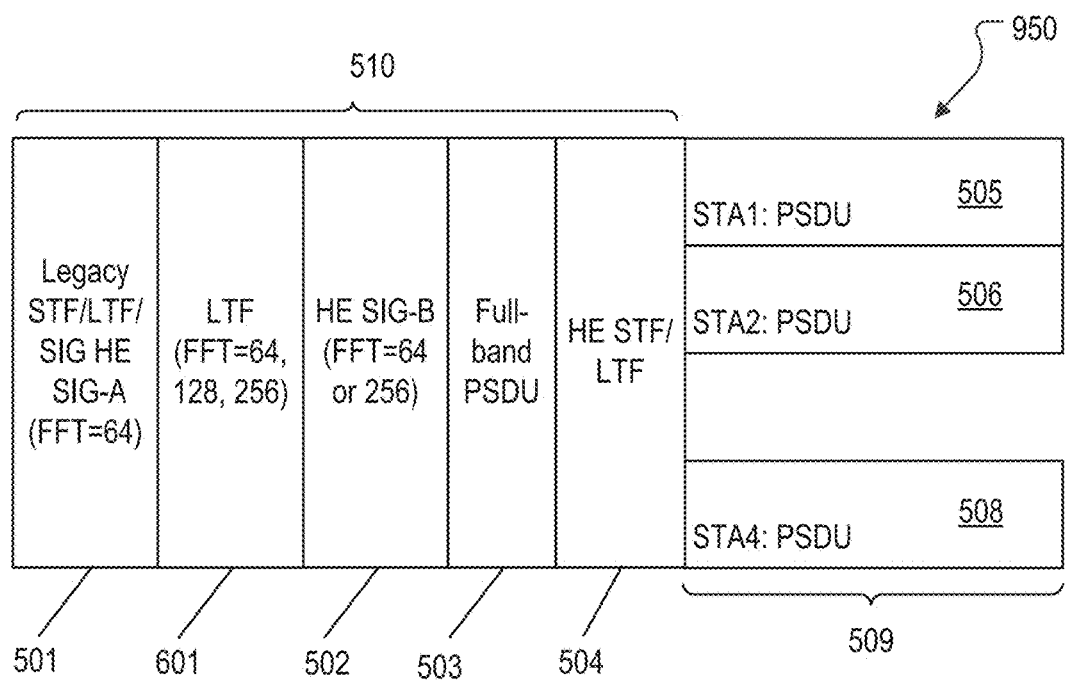

FIGS. 9A and 9B illustrate schematic diagrams of examples of downlink frames, each carrying resource assignments with a full-band PSDU. The description for FIGS. 5 and 6 generally apply to FIGS. 9A and 9B, with examples of differences between FIGS. 5 and 6 and FIGS. 9A and 9B and other descriptions are provided herein for purposes of clarity and simplicity.

In FIG. 9A, a DL OFDMA PPDU 900 includes four sub-bands, where not all four sub-bands carry payloads and only the sub-bands shown for {STA1, STA2, STA4} carry payload to these STAs. In comparison to FIGS. 5 and 6, there is no payload for STA3 and that sub-band carries no signal. In one aspect, the full-band PSDU 503 carries a frame to STA0. In one or more implementations, the FullbandTX field in the HE SIG-A 501 is set to one to indicate that there is a full-band PSDU. In this respect, the sequence of the fields in the HE SIG-B 502 is as follows: {full-band PSDU attributes for STA0}, followed by {Sub-band MAP, which indicates the case that only the third sub-band is empty}, followed by {sub-band PSDU attributes for STA1}, followed by {sub-band PSDU attributes for STA2}, and followed by {sub-band PSDU attributes for STA4}. Note that the sub-band PSDU attributes are placed in a pre-known order e.g., from low to high sub-band index, but only for those sub-bands that are not empty. FIG. 9B illustrates a DL OFDMA PPDU 950 that is the same as the DL OFDMA PPDU 900, except that the DL OFDMA PPDU 950 includes an LTF 601 immediately before the HE SIG-B 502.

Figure 10A:
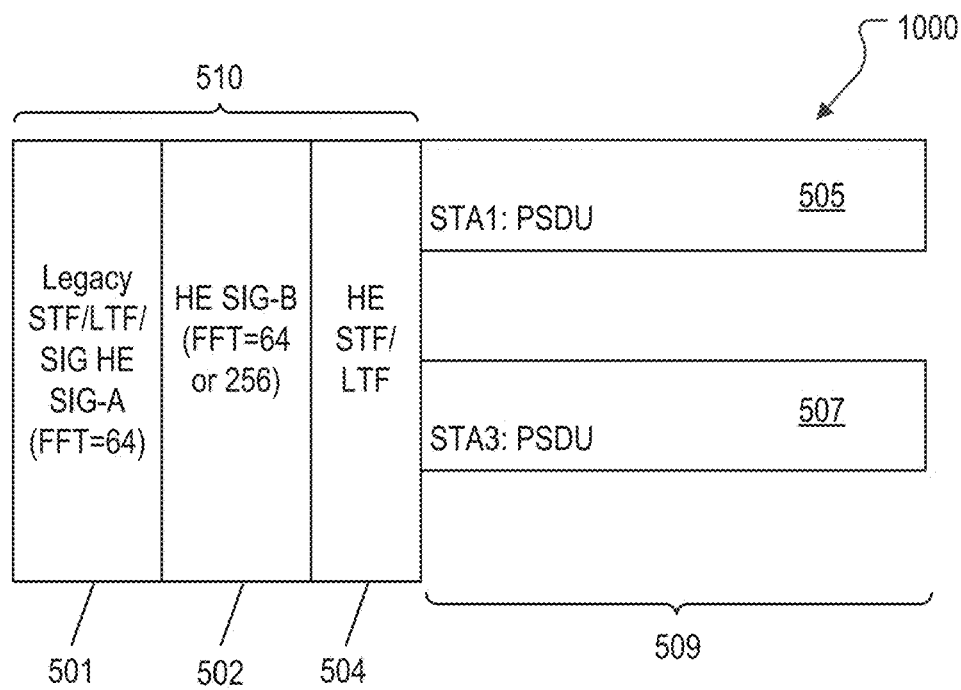
FIGS. 10A and 10B illustrate schematic diagrams of examples of downlink frames carrying resource assignments.
Figure 10B:
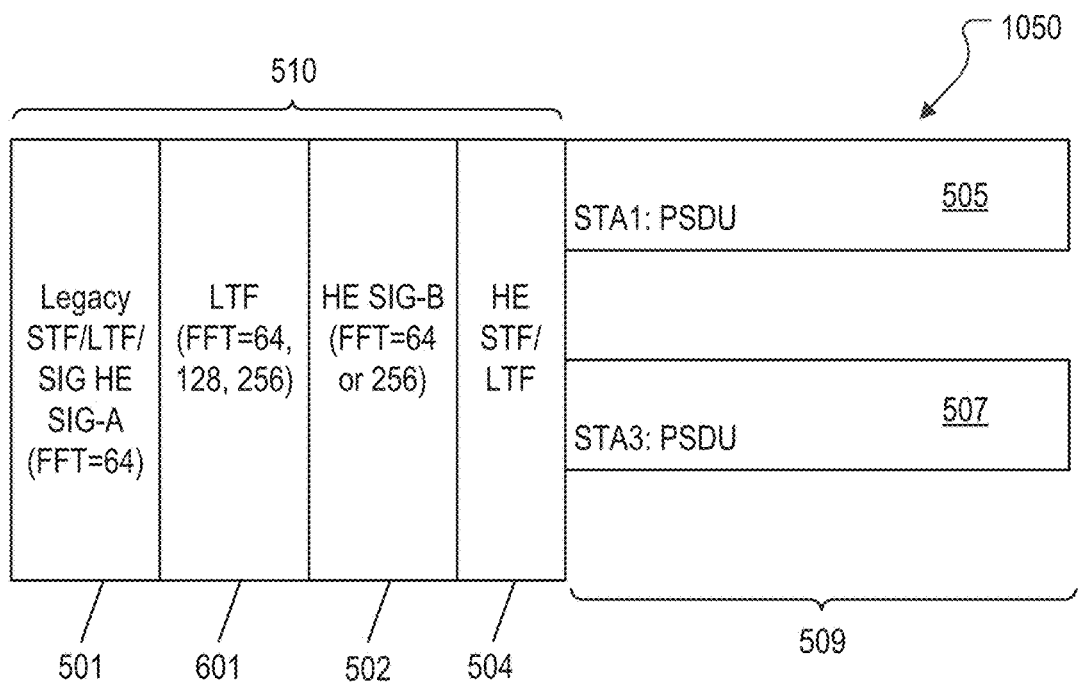

FIGS. 10A and 10B illustrate schematic diagrams of examples of downlink frames, each carrying resource assignments without a full-band PSDU. The description for FIGS. 5 and 6 generally apply to FIGS. 10A and 10B, with examples of differences between FIGS. 5 and 6 and FIGS. 10A and 10B and other descriptions are provided herein for purposes of clarity and simplicity.

In FIG. 10A, a DL OFDMA PPDU 1000 includes four sub-bands, where not all four sub-bands carry payloads and only the sub-bands shown for {STA1, STA3} carry payload to these STAs. In comparison to FIGS. 5 and 6, there is no payload for either STA2 or STA4 such that these sub-bands carry no signal, and the DL OFDMA PPDU 1000 does not carry a full-band PSDU. In one or more implementations, the FullbandTX field in the HE SIG-A 501 is set to zero to indicate that there is no full-band PSDU. Then the sequence of the fields in the HE SIG-B 502 is, for instance, as follows: {Sub-band MAP, which indicates the case that the second and fourth sub-bands are empty}, followed by {sub-band PSDU attributes for STA1}, and followed by {sub-band PSDU attributes for STA3}. Note that the sub-band PSDU attributes are placed in a pre-known order e.g., from low to high sub-band index, but only for those sub-bands that are not empty. FIG. 10B illustrates a DL OFDMA PPDU 1050 that is the same as the DL OFDMA PPDU 1000, except that the DL OFDMA PPDU 1050 includes an LTF 601 immediately before the HE SIG-B 502.

In one or more implementations, the sequence of the HE SIG-B 502 may start with a Length field to indicate the length of the HE SIG-B 502. In some aspects, the sequence may include an MCS field. In another aspect, the MCS field is fixed to MCS0; hence no need to indicate this in the sequence for the HE SIG-B 502. Alternatively the length and MCS information may be present in the HE SIG-A 501. In addition, the HE SIG-B 502 sequence may include a cyclic redundancy code (CRC) field or a frame check sequence (FCS) field that allows the receiver to identify whether the HE SIG-B 502 was received correctly or not.

In one or more implementations, a general identification method can be used for DL MU MIMO, UL MU MIMO, DL Multicast transmission, and DL/UL OFDMA. Due to its general applicability, this identification may be called Generalized Group Identification or GGID. The structure of GGID may be as follows: GGID has the length of G bits, e.g., 6 bits or 8 bits. GGID is announced in one of the SIG symbols, such as the HE SIG-A 501 or the HE SIG-B 502, and it indicates the group of the STAs that are recipients of the frame that carries the GGID. The frame that carries GGID can be a DL MU MIMO frame (e.g., a trigger frame that initiates a UL MIMO frame), a DL OFDMA frame (e.g., a trigger frame that initiates a UL OFDMA frame), or a multicast frame.

When GGID is used for Multicast indication, in one aspect, no additional identification other than the GGID is announced. The content of a Generalized Group Membership Management (GGMM) frame may be as follows: Category (mandatory field), HE Action (mandatory field, set to Multicast GGID), and Membership Status Array (mandatory field).

When GGID is used for DL MU MIMO indication, in one aspect, additional identification for identifying the position of each user in the DL MU MIMO is announced. The content of the GGMM frame may be as follows: Category (mandatory field), HE Action (mandatory field, set to DL MU MIMO GGID), Membership Status Array (mandatory field), and User Position Array (mandatory field).

When GGID is used for UL MU MIMO indication, in one aspect, additional identification for identifying the position of each user in the UL MU MIMO is announced. The content of the GGMM frame may be as follows: Category (mandatory field), HE Action (mandatory field, set to UL MU MIMO GGID), Membership Status Array (mandatory field), and User Position Array (mandatory field).

When GGID is used for DL OFDMA or UL OFDMA indication, in one aspect, no additional identification other than the GGID is announced. The content of the GGMM frame may be as follows: Category (mandatory field), HE Action (mandatory field, set to OFDMA GGID), and Membership Status Array (mandatory field).

By above way of encoding the GGMM frame, the AP may let the STAs know how to interpret the GGID (e.g., whether it is an ID for multicast transmission, DL/UL MU MIMO transmission, or DL/UL OFDMA) during the announcement of the membership of the GGIDs to each STA. Note that the GGID can be used as an identification method in the implementations related to FIGS. 5 and 6.

Note that in a Membership Status Array, the AP can assign one bit for each possible GGID, and the AP can set the GGID to one if the STA belongs to that GGID, otherwise the AP sets the GGID to zero. In a User Position Array, the AP assigns a multiple-bit subfield for each possible GGID, and the AP sets the GGID to indicate the user position of the STA in that GGID if the STA belongs to that GGID; otherwise, the AP sets the GGID to zero.

In one or more aspects, the fields and subfields described in the above implementations appear as a TXVECTOR parameter between MAC and PHY sub-layers in a transmitting STA. In addition, the fields and subfields described in the above implementations appear as a RXVECTOR parameter between MAC and PHY sub-layers in a receiving STA. Specifically, the "FullbandTX" field described above can be a TXVECTOR parameter that is optionally present for a PPDU. When "FullbandTX" field is equal to one for a sub-band, the PHY sub-layer of the transmitting STA may add HE STF and/or HE LTF symbols before the subsequent PSDU as described above.

The capability to aggregate multiple PSDUs in a single sub-band may be limited to some AP or STAs; hence, some capability fields are described below to indicate such capability. In HE Capabilities, a subfield denoted by TXFullbandPSDUCapability (1 bit) indicates whether an AP is capable of aggregating full-band PSDU (e.g., full-band PSDU 503 of FIG. 5) in a DL OFDMA PPDU. If an AP is capable, the AP can set TXFullbandPSDUCapability to one; otherwise, the AP sets the TXFullbandPSDUCapability to zero. In HE Capabilities, a subfield denoted by RXFullbandPSDUCapability (1 bit) indicates whether a STA is capable of receiving a full-band PSDU in a DL OFDMA PPDU. If a STA is capable, the STA sets the RXFullbandPSDUCapability to one; otherwise, the STA sets the RXFullbandPSDUCapability to zero. Alternatively, this capability field may be interpreted as if a STA is capable of receiving a full-band PSDU in addition to one or more sub-band PSDUs in a single DL OFDMA PPDU. In this respect, the STA can set the RXFullbandPSDUCapability to one; otherwise, the STA sets the RXFullbandPSDUCapability to zero.

In one or more aspects, an AP may generate a frame (e.g., 400, 420, 440, 460, 500, 600, 900, 950, 1000 or 1050), including a common field and a user specific field, and the AP may transmit the frame to all STAs (e.g., to STA1, STA2, STA3 and STA4 in FIG. 5 or 6, or to $STA_x$, $STA_y$, STAz, and $STA_w$ in connection with FIG. 4A-4F) or to a group of STAs (e.g., STA1 and STA3 in FIG. 10A or 10B, or to $STA_x$, $STA_z$, and $STA_w$ in connection with FIG. 4A-4F). Thus, all STAs or a group of STAs may be stations designated to receive the frame from the AP. In one aspect, a common field and one or more user specific fields are located in the HE SIG-B field of the frame.

A common field may be, for example, a sub-band map, or a portion of a downlink map such as a sequence that uniquely identifies several resource units and their specific order in the transmission bandwidth. The common field may include information (e.g., resource unit allocation) for, or associated with, all of the designated STAs.

A user specific field may be, for example, a sub-band PSDU attributes field 806, or a portion of a downlink map such as a sequence that identifies transmission properties of the PSDU that is associated with. The user specific field may include, or consist of, multiple sub-fields, which are not part of the common field. The multiple sub-fields may be, for example, sub-band PSDU attributes sub-fields 806-1 through 806-$k$, or a portion of a downlink map such as a sequence that identifies transmission properties of the PSDU that is associated with, where the attributes are, for example, MCS, NSS, Coding, Association ID (AID) or Partial AID.

In one aspect, at least one of the multiple sub-fields is for, or associated with, each of the designated STAs. For example, the sub-band PSDU attributes sub-field 806-1 may be specifically for STA1 and assigned to STA1 (and not to other STAs), and the sub-band PSDU attributes sub-field 806-2 may be specifically for STA2 and assigned to STA2 (and not to other STAs); the sub-band PSDU attributes sub-field 806-3 may be specifically for STA3 and assigned to STA3 (and not to other STAs); and the sub-band PSDU attributes sub-field 806-4 may be specifically for STA4 and assigned to STA4 (and not to other STAs). In another example, $MCS_x$ may be specifically for $STA_x$; $MCS_z$ may be specially for $STA_z$; and $MCS_w$ may be specially for $STA_w$.

In some examples, multiple sub-bands may be allocated to a STA (see, e.g., FIGS. 4A-4F); hence, in one aspect, multiple (or several) of the sub-fields may be for a STA or for each STA. In one or more aspects, one or more sub-fields include information specific (or assigned) to a STA or to each STA (and not to other STAs).

In one or more aspects, a STA may receive the frame from the AP and determine the common field (common to all designated STAs) and at least one sub-field (assigned to the STA), based on the frame received from the AP. In one aspect, the STA may decode the common field and the user specific field to determine that the at least one sub-field is specific to (or assigned to) the STA, and other sub-fields are not specific to (or assigned to) the STA. The STA can decode one or more respective portions of the received frame based on the common field and the at least one sub-field. The STA can then provide the decoded one or more portions of the received frame for further internal processing.

In some aspects, the STA may receive a trigger frame from the AP and process the trigger frame to determine the common field and at least one sub-field. The STA may generate, in response to the trigger frame, an uplink frame for a multi-user transmission (see, e.g., STA3's frame for the UL MU PPDU 704 in FIG. 7A, or STA12's frame for the UL MU PPDU 753 in FIG. 7B). In this case, the STA utilizes the common field and the at least one sub-field to generate the uplink frame, but the STA does not utilize the other sub-fields not specific to (or assigned to) the STA in generating the uplink frame. In one or more implementations, the common field and the user specific field are located in a MAC header field of the received trigger frame. In other implementations, the common field and the user specific field are located in a MAC payload of the received trigger frame.

In one aspect, a common field includes resource unit allocation. In one example, a sub-band map indicates which sub-band arrangement has been used in a corresponding PPDU and which sub-bands are occupied. In another example, a downlink map lists resource unit(s) for each STA. In this regard, the resource unit allocation is associated with the STAs for uplink OFDMA. In one aspect, a DL OFDMA PPDU (e.g., 400, 420, 440, 460, 500, 600, 900, 950, 1000 or 1050) includes resource unit assignment and MCS for each STA. In one example, the resource unit allocation comprises sub-band assignments for the STAs.

In one or more aspects, some of the descriptions referencing one or more figures are not repeated with respect to other figures for brevity, and thus, the description for one or more figures may generally apply to other figures unless stated otherwise. Like reference numerals may designate like elements. For example, same reference numerals (e.g., 501, 502, 503, 504, 505, 506, 507, 508, 509, 510, 601, 804 and 806) are used in various figures for simplicity and convenience. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

Figure 11A:
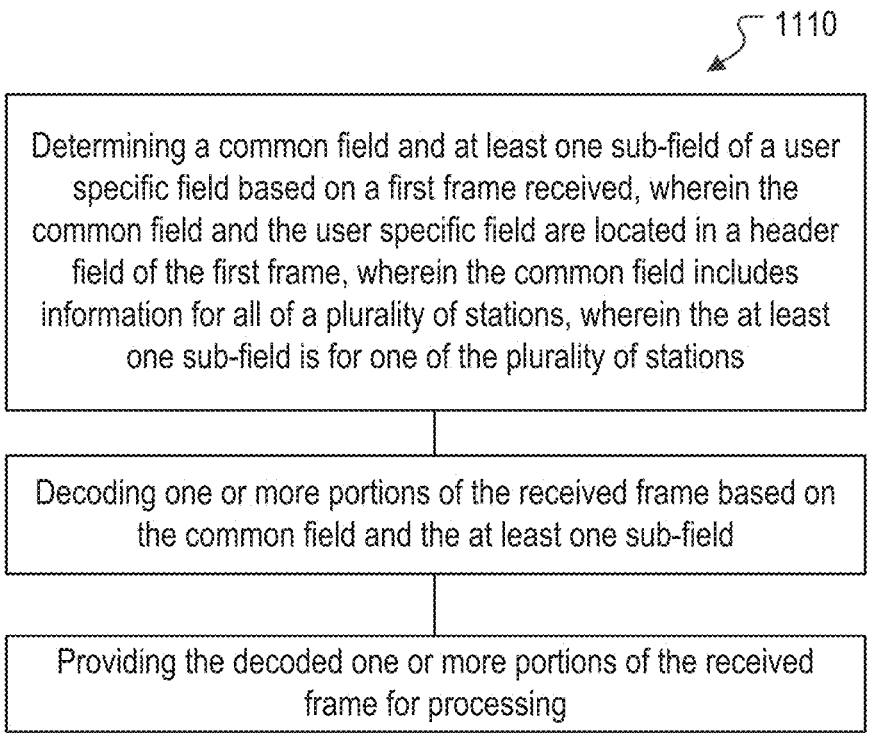
FIGS. 11A-11C illustrate flow charts of examples of methods for multi-user resource assignments.
Figure 11B:
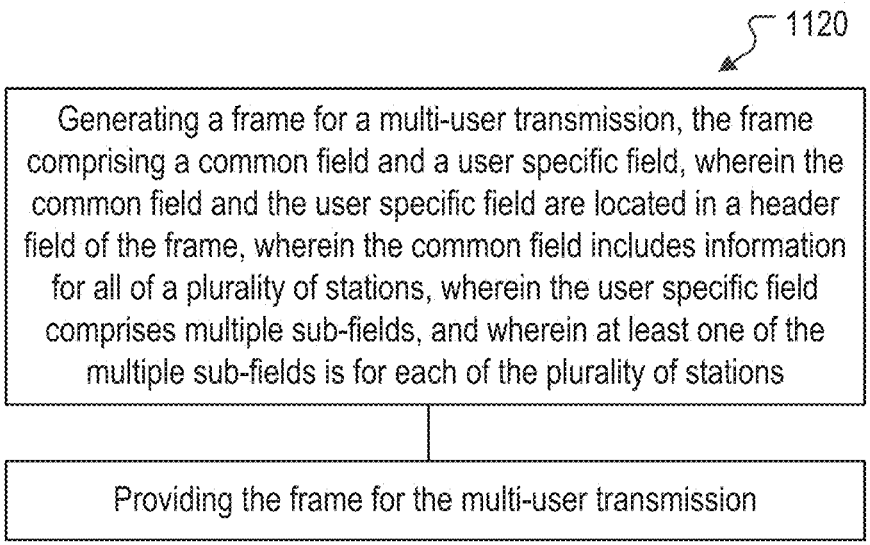
Figure 11C:
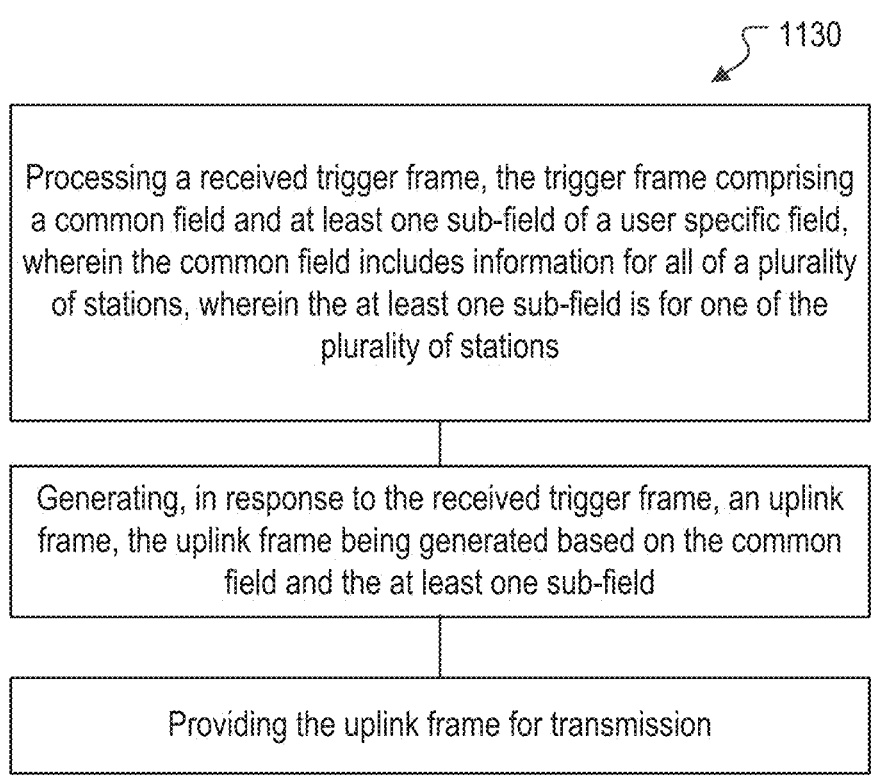

FIGS. 11A-11C illustrate flow charts of examples of methods for multi-user resource assignments. For explanatory and illustration purposes, the example processes 1110, 1120 and 1130 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 1110, 1120 and 1130 are not limited to the wireless communication devices 111-115 of FIG. 1 or their components, and the example processes 1110, 1120 and 1130 may be performed by some of the devices shown in FIG. 1, or other devices or components. Further for explanatory and illustration purposes, the blocks of the example processes 1110, 1120 and 1130 are described herein as occurring in serial or linearly. However, multiple blocks of the example processes 1110, 1120 and 1130 may occur in parallel. In addition, the blocks of the example processes 1110, 1120 and 1130 need not be performed in the order shown and/or one or more of the blocks/actions of the example processes 1110, 1120 and 1130 need not be performed.

Various examples of aspects of the disclosure are described below as clauses for convenience. These are provided as examples, and do not limit the subject technology. As an example, some of the clauses described below are illustrated in FIGS. 11A-11C.

Clause A. An apparatus for facilitating wireless communication, the apparatus comprising: one or more memories; and one or more processors coupled to the one or more memories, the one or more processors configured to cause: determining a common field and at least one sub-field of a user specific field based on a received frame, wherein the common field and the user specific field are located in a header field of the received frame, wherein the common field includes information for all of a plurality of stations, and wherein the at least one sub-field includes information specific to one of the plurality of stations; decoding one or more portions of the received frame based on the common field and the at least one sub-field; and providing the decoded one or more portions of the received frame for processing.

Clause B. A non-transitory computer-readable storage medium storing computer-executable instructions that, when executed by one or more processors, cause one or more processors to perform operations, the operations comprising: generating a frame for a multi-user transmission, the frame comprising a common field and a user specific field, wherein the common field and the user specific field are located in a header field of the frame, wherein the common field includes information for all of a plurality of stations, wherein the user specific field comprises multiple sub-fields, and wherein at least one of the multiple sub-fields is for each of the plurality of stations; and providing the frame for the multi-user transmission.

Clause C. A computer-implemented method of facilitating wireless communication, the method comprising: processing a received trigger frame, the trigger frame comprising a common field and at least one sub-field of a user specific field, wherein the common field includes information for all of a plurality of stations, wherein the at least one sub-field is for one of the plurality of stations; generating, in response to the received trigger frame, an uplink frame, the uplink frame being generated based on the common field and the at least one sub-field; and providing the uplink frame for transmission.

In one or more aspects, additional clauses are described below.

A method comprising one or more methods or operations described herein.

An apparatus comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus for facilitating wireless communication, the apparatus comprising:
one or more memories; and
one or more processors coupled to the one or more memories, the one or more processors configured to cause:
determining a common field and at least one sub-field of a user specific field based on a downlink frame, wherein the common field and the user specific field are located in a first header field of the downlink frame, wherein the common field includes information for a plurality of stations, wherein the at least one sub-field includes information specific to one of the plurality of stations, wherein the downlink frame further comprises a first full-band physical layer convergence procedure (PLCP) service data unit (PSDU) interposed between the first header field and a second header field of the downlink frame and a second PSDU following the second header field, and wherein the first full-band PSDU occupies a full-band region of a corresponding bandwidth and the second PSDU occupies a sub-band region of the corresponding bandwidth;
decoding one or more portions of the downlink frame based on the common field and the at least one sub-field;
providing the decoded one or more portions of the downlink frame for processing; and
transmitting, by the apparatus to an access point, a radio frequency (RF) signal carrying an uplink frame at one or more sub-band assignments based on the decoded one or more portions of the downlink frame, wherein the first header field comprises first attributes for the first full-band PSDU and second attributes for the second PSDU, wherein the first attributes indicate a number of symbols that the first full-band PSDU occupies in the full-band region, and wherein the second attributes indicate which sub-bands of the corresponding bandwidth are occupied by the second PSDU.

2. The apparatus of claim 1, wherein the first header field is a high efficiency signal-B (HE SIG-B) field.

3. The apparatus of claim 1, wherein the common field comprises resource unit allocation.

4. The apparatus of claim 3, wherein the resource unit allocation is associated with the plurality of stations for downlink Orthogonal Frequency Division Multiple Access (OFDMA) or multiuser MIMO (MU-MIMO) or both.

5. The apparatus of claim 4, wherein the at least one sub-field includes at least one of a modulation and coding scheme (MCS), an association identifier (AID), coding information, a number of space-time streams (NSTS), a space-time block coding (STBC), and single-user (SU) beamformed information which is specific to the one of the plurality of stations for downlink OFDMA.

6. The apparatus of claim 1, wherein the plurality of stations are stations designated to receive the downlink frame in the corresponding bandwidth.

7. The apparatus of claim 1, wherein the common field is followed by the user specific field.

8. The apparatus of claim 1, wherein the user specific field consists of multiple sub-fields that are not part of the common field.

9. The apparatus of claim 8, wherein each of the plurality of stations is assigned to at least one of the multiple sub-fields.

10. The apparatus of claim 9, wherein the plurality of stations are stations designated to receive the downlink frame.

11. A non-transitory computer-readable storage medium storing computer-executable instructions that, when executed by one or more processors, cause one or more processors to perform operations, the operations comprising:
  generating a frame for a multi-user transmission, the frame comprising a common field and a user specific field, wherein the common field and the user specific field are located in a first header field of the frame, wherein the common field includes information for a plurality of stations, wherein the user specific field comprises multiple sub-fields, wherein each of the plurality of stations is assigned to at least one of the multiple sub-fields, wherein the frame further comprises a first full-band physical layer convergence procedure (PLCP) service data unit (PSDU) interposed between the first header field and a second header field of the frame and a second PSDU following the second header field, wherein the first full-band PSDU occupies a full-band region of a corresponding bandwidth and the second PSDU occupies a sub-band region of the corresponding bandwidth, wherein the first header field comprises first attributes for the first full-band PSDU and second attributes for the second PSDU, wherein the first attributes indicate a number of symbols that the first full-band PSDU occupies in the full-band region, and wherein the second attributes indicate which sub-bands of the corresponding bandwidth are occupied by the second PSDU; and
  providing the frame for the multi-user transmission to the plurality of stations, the frame eliciting a response from at least one of the plurality of stations at one or more sub-band assignments based on the common field and the user specific field.

12. The non-transitory computer-readable storage medium of claim 11, wherein each of the multiple sub-fields comprises at least one of a modulation and coding scheme (MCS), an association identifier (AID), coding information, a number of space-time streams (NSTS), a space-time block coding (STBC), and single-user (SU) beamformed information.

13. The non-transitory computer-readable storage medium of claim 11, wherein the multiple sub-fields are placed in a predetermined order of a sequence based on a sub-band index.

14. The non-transitory computer-readable storage medium of claim 11, wherein the multiple sub-fields are placed in an order of an increasing frequency sequence or a decreasing frequency sequence as the common field indicates.

15. The non-transitory computer-readable storage medium of claim 11, wherein the common field is followed by a first one of the multiple sub-fields, wherein the first one is followed by a second one of the multiple sub-fields, and wherein the second one is followed by a third one of the multiple sub-fields.

16. The non-transitory computer-readable storage medium of claim 11, wherein the frame further comprises a full-band PSDU attribute field including at least one of an identifier (ID), a modulation and coding scheme (MCS), coding information, a space-time block coding (STBC), and length and number of OFDM symbols that the first full-band PSDU occupies.

17. A computer-implemented method of facilitating wireless communication, the method comprising:
  processing a received trigger frame, the received trigger frame comprising a common field and at least one sub-field of a user specific field located in a first header field of the received trigger frame, wherein the common field includes information for a plurality of stations, wherein the at least one sub-field is for one of the plurality of stations, wherein the received trigger frame further comprises a first full-band physical layer convergence procedure (PLCP) service data unit (PSDU) interposed between the first header field and a second header field of the received trigger frame and a second PSDU following the second header field, wherein the first full-band PSDU occupies a full-band region of a corresponding bandwidth and the second PSDU occupies a sub-band region of the corresponding bandwidth, wherein the first header field comprises first attributes for the first full-band PSDU and second attributes for the second PSDU, wherein the first attributes indicate a number of symbols that the first full-band PSDU occupies in the full-band region, and wherein the second attributes indicate which sub-bands of the corresponding bandwidth are occupied by the second PSDU;
  generating, in response to the received trigger frame, an uplink frame, the uplink frame being generated based on the common field and the at least one sub-field; and
  providing, for transmission, a radio frequency (RF) signal carrying the uplink frame at one or more sub-band assignments based on the common field and the at least one sub-field.

18. The computer-implemented method of claim 17, wherein the common field and the user specific field are located in a payload section of the received trigger frame.

19. The apparatus of claim 1, wherein the one or more processors are configured to further cause:
  receiving, by the apparatus from the access point, a second RF signal carrying the downlink frame including a first header field and a second header field immediately following the first header field.

20. The apparatus of claim 19, wherein a modulation and coding scheme (MCS) used for encoding the second header field is indicated in the first header field.

21. The apparatus of claim 20, wherein:
the common field includes information on where data units of the plurality of stations are located, and
information specific to one of the plurality of stations includes an identifier and a MCS for the one of the plurality of stations.

22. The apparatus of claim 1, wherein the information of the common field indicates which of a plurality of sub-bands of the corresponding bandwidth are occupied sub-bands and empty sub-bands.

23. The apparatus of claim 22, wherein the at least one sub-field excludes information for the empty sub-bands.

24. The apparatus of claim 1, wherein the downlink frame comprises one or more of a set of high efficiency long training field (HE LTF) symbols or high efficiency short training field (HE STF) symbols that precede the first full-band PSDU and are not beamformed.

25. The non-transitory computer-readable storage medium of claim 11, wherein the frame comprises one or more of a set of high efficiency long training field (HE LTF) symbols or high efficiency short training field (HE STF) symbols that follow the first full-band PSDU and are not beamformed.

26. The computer-implemented method of claim 17, wherein the received trigger frame comprises one or more of a set of high efficiency long training field (HE LTF) symbols or high efficiency short training field (HE STF) symbols that precede the first full-band PSDU and are not beamformed.

* * * * *